United States Patent [19]
Bradley et al.

[11] Patent Number: 6,061,607
[45] Date of Patent: May 9, 2000

[54] ORDER PICK SYSTEM

[75] Inventors: Robert E. Bradley; David H. Loy, both of York, Pa.

[73] Assignee: St. Onge Company, York, Pa.

[21] Appl. No.: 09/019,274

[22] Filed: Feb. 5, 1998

Related U.S. Application Data

[63] Continuation-in-part of application No. 08/896,919, Jul. 18, 1997, abandoned.

[51] Int. Cl.[7] .................................................. G06F 17/00
[52] U.S. Cl. ........................ 700/216; 414/273; 414/280
[58] Field of Search ................................... 700/214, 216, 700/217, 219; 414/273, 280, 267, 626, 627

[56] References Cited

U.S. PATENT DOCUMENTS

| | | |
|---|---|---|
| 2,920,916 | 1/1960 | Pagdin . |
| 3,526,327 | 9/1970 | Atwater . |
| 3,661,280 | 5/1972 | Atwater . |
| 3,782,564 | 1/1974 | Burt . |
| 4,000,821 | 1/1977 | Naito et al. . |
| 4,176,995 | 12/1979 | Wise . |
| 4,516,762 | 5/1985 | Moltrasio et al. . |
| 4,542,808 | 9/1985 | Lloyd, Jr. et al. . |
| 4,678,390 | 7/1987 | Bonneton et al. . |

(List continued on next page.)

FOREIGN PATENT DOCUMENTS

| | | |
|---|---|---|
| 0 611 707 | 8/1994 | European Pat. Off. . |
| 0 621 215 | 10/1994 | European Pat. Off. . |
| 2 593 481 | 7/1987 | France . |
| 2 696 722 | 4/1994 | France . |

OTHER PUBLICATIONS

Macron Dynamics, Inc., *High Speed Linear Actuators That Go The Distance*, one page, Jul. 17, 1996.

Sensoflex Vacuum Gripper System VG102–1, one page, Jul. 17, 1996.

Barry Wright Corporation, *Sensoflex™ Vacuum Gripper System*\* Part No. VG101–1, one page, Jul. 17, 1996.

*Senoflex Vacuum Grippers*, VGC100, one page, Jul. 17, 1996.

SI Handling Systems, Inc., *The Next Generation Order Selection Machine*, one page, Jul. 17, 1996.

*Primary Examiner*—Christopher P. Ellis
*Assistant Examiner*—Khoi H. Tran
*Attorney, Agent, or Firm*—Flynn, Thiel, Boutell & Tanis, P.C.

[57] ABSTRACT

An automated storage and retrieval system (ASRS) wherein individual identical articles are disposed in vertical stacks stored in cells of movable totes. The totes are movable into and out of storage racks by an automated storage/retrieval vehicle. The ASRS includes an order picking system having at least two zones disposed along an order-collecting conveyor system. One zone picks low-demand articles, and the other zone employs high-speed dispensers which support plural upright stacks each containing identical high-demand articles for dispensing of such articles onto the conveyor system. A controller assigns order-collecting areas along the conveyor system so that picked or dispensed articles within the zones are deposited into a preassigned area for assembly of an order. The pick zone for low-demand articles preferably includes several subzones arranged serially of the conveyor system, and each subzone includes a picker mechanism which includes a picking head which moves longitudinally and transversely of the conveyor. A plurality of totes are supported adjacent and longitudinally along at least one side of the conveyor system, with the cells in each tote typically defining plural stacks of different articles all having a preassigned position relative to the movement of the picking head. The controller causes the picking head to remove a desired article from a specific cell for transfer to the preassigned area of the conveyor system. This process can be repeated within one subzone, and sequentially within several subzones, for filling a single order with low-demand articles which are deposited into the preassigned area.

17 Claims, 28 Drawing Sheets

U.S. PATENT DOCUMENTS

| | | |
|---|---|---|
| 4,792,273 | 12/1988 | Specht . |
| 4,850,783 | 7/1989 | Maekawa . |
| 4,883,401 | 11/1989 | Kavieff . |
| 4,932,828 | 6/1990 | Katae et al. . |
| 4,974,166 | 11/1990 | Maney et al. . |
| 5,271,703 | 12/1993 | Lindqvist et al. . |
| 5,340,263 | 8/1994 | Neri et al. . |
| 5,346,351 | 9/1994 | Priolo et al. . |
| 5,358,375 | 10/1994 | Kawada et al. . |
| 5,363,310 | 11/1994 | Haj-Ali-Ahmadi . |
| 5,372,473 | 12/1994 | Moyden et al. . |
| 5,380,139 | 1/1995 | Pohjonen et al. . |
| 5,385,243 | 1/1995 | Jackson et al. . |
| 5,395,206 | 3/1995 | Cerny, Jr. . |
| 5,439,345 | 8/1995 | Ivo . |
| 5,468,110 | 11/1995 | McDonald et al. . |
| 5,476,191 | 12/1995 | Dunford et al. . |
| 5,478,183 | 12/1995 | Savigny . |
| 5,482,139 | 1/1996 | Rivalto . |
| 5,509,572 | 4/1996 | Curtis . |
| 5,564,879 | 10/1996 | Noguchi . |
| 5,564,893 | 10/1996 | Tacchi et al. . |
| 5,582,497 | 12/1996 | Noguchi ................... 414/218 |
| 5,636,966 | 6/1997 | Lyon et al. ............ 414/791.6 |
| 5,733,098 | 3/1998 | Lyon et al. .............. 414/786 |
| 5,903,457 | 5/1999 | Chang ................. 364/478.01 |

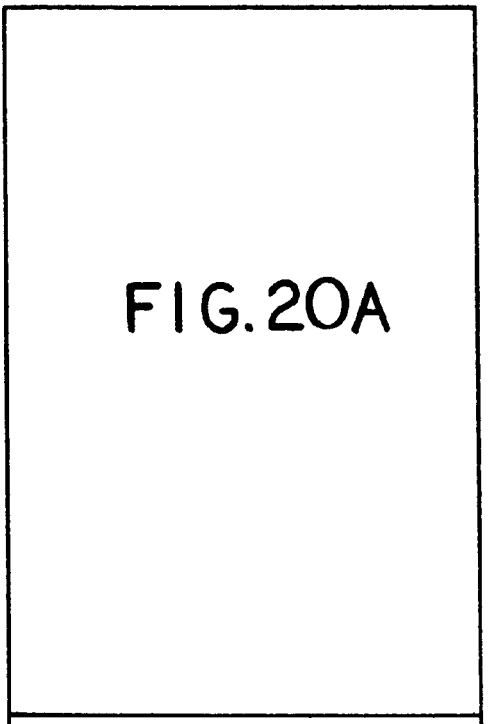
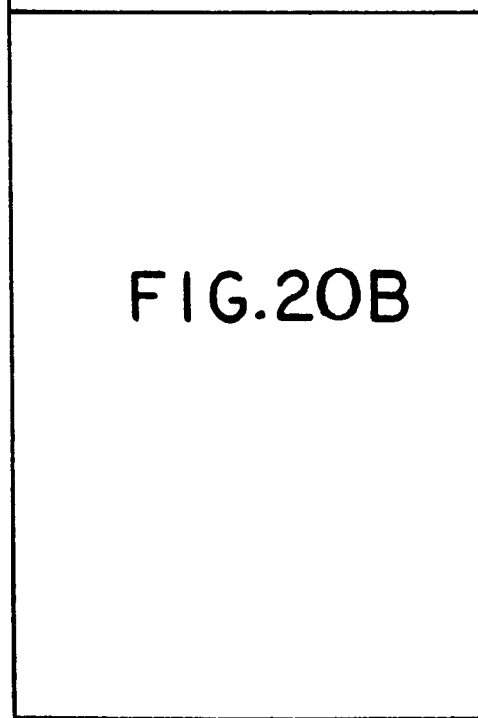
FIG. 20

ORDER PICK SYSTEM

CROSS REFERENCE TO RELATED APPLICATION

This is a continuation-in-part of our application Ser. No. 08/896,919, filed Jul. 18, 1997 entitled "ORDER PICK SYSTEM" now abandoned.

FIELD OF THE INVENTION

This invention relates to an article retrieval system and, more particularly, to an improved order picking process and apparatus which permits automated and efficient filling of a large quantity of orders, many of which contain multiple but different articles, by selecting the individual articles from an inventory which contains large number of articles including both high-demand articles as well as low and moderate demand articles.

BACKGROUND OF THE INVENTION

Numerous automated storage and retrieval systems (ASRS) have been developed, particularly for permitting storage and retrieval of containers of articles such as cases or cartons in warehousing arrangements. Such ASRS typically involve storage racks wherein articles are disposed in horizontal rows and in vertical columns, with an automated stacker crane or the like being movable horizontally and vertically along the front of the storage rack and having an extendible article transfer mechanism associated therewith for permitting an individual article to be moved into a rack, or removed therefrom when retrieval is desired. Such arrangements are also conventionally tied in with a central controller or computer which not only programs the movement of the stacker crane for storing or retrieving articles, but also inventories all of the stored articles within containers including the locations thereof. Such storage/retrieval arrangements, however, are normally suitable solely for handling relatively large articles such as cartons or the like, and are limited with respect to the number of articles which can be handled within any defined time interval. In particular, such arrangements are not suitable for mass handling of small articles, and particularly the storing and retrieval of small articles so as to assemble pluralities of such articles into pluralities of individual orders.

To assist in automated order filling, various automated dispensing systems have been developed which permit storage of like articles in stacks, with the dispensing arrangement permitting dispensing of the lowermost article, such as on to a conveyor to permit collection thereon of a number of such articles which make up an order. With such arrangements, the dispensers are designed for handling large quantities of like articles and hence are particularly suited for articles which are in high demand. The structural complexity and overall cost of arrangements of this type, however, do not make dispensers of this type particularly suitable for the handling of articles and the filling of orders where the articles are in low demand, and particularly where there is an extremely large inventory of different low-demand articles from which individual articles must be selected to fill an order.

Examples of dispensers of the aforementioned type, which are particularly suitable for dispensing a high volume of high-demand articles, are disclosed in U.S. Pat. Nos. 4,000,821 and 5,271,703.

Accordingly, while most order picking or fulfillment systems permit large quantities of specific articles or items, typically high-demand items, to be automatically picked or dispensed, nevertheless the low or moderate demand articles or items typically must be manually picked for subsequent consolidation with the high-demand articles which have been automatically picked or dispensed. This thus results in the overall order fulfillment process being slower and less efficient than desired since the manual fulfillment phase of the order picking process thus controls the efficiency and speed with which the overall order-picking process can be carried out.

It is thus an object of this invention to provide an automated storage and retrieval system for articles, particularly an order picking system which can be fully automated for permitting storage and retrieval of not only high-demand articles but also low-demand articles, whereby the improved arrangement is capable of overcoming the disadvantages which have been conventionally experienced with prior known systems.

It is an object of this invention to provide an automated storage and retrieval system which is particularly suitable for handling an inventory of articles which includes an extremely large number of different articles, which inventory includes a small percentage of articles which normally represent the articles which are of high demand, with the remaining majority percentage of the inventoried articles representing those articles which are only of low or moderate demand, with the improved automated storage and retrieval system being capable of automatically retrieving not only high-demand articles but also the low and moderate demand articles so as to permit picking of the selected articles in accordance with an order so as to automatically combine the discrete picked articles which define the order.

In the improved automated storage and retrieval system of this invention, the individual articles are typically stored in vertical stacks, each stack containing a plurality of identical articles, with the stacks being stored in cells which in turn are defined within movable containers or totes, each of which is subdivided into a rectangular array of upwardly opening cells, each capable of holding a stack of identical articles therein. The totes are disposed for storage in racks which preferably include multiple vertically spaced shelves each capable of holding a large number of totes in side-by-side relation therealong, with the individual totes being movable into and out of the racks by automated storage and retrieval devices, such as stacker cranes or carousels of conventional construction. The totes containing the high-demand articles will typically have identical articles defining the stack of each cell, whereas the totes containing moderate or low demand articles will have multiple stacks defined by different articles, whereby one or more cells contain a stack of one type article, and other cells contain stacks of different articles. The ASRS of this invention includes an order picking system having at least two zones disposed in series along an order-collecting conveyor system. One zone is for picking of low and moderate demand articles, and the other zone employs high-speed dispensers which support a plurality of upright stacks, each stack being of identical high-demand articles, for permitting dispensing of high-demand articles onto the order-collecting conveyor system. A computerized controller assigns order-collecting areas or regions in spaced relation along the conveyor system so that individual picked articles within the two zones are deposited into a preassigned area to permit assembly of an order therein. The order picking zone for the low and moderate demand articles typically involves several subzones arranged serially along the conveyor system, and each subzone includes a picker mechanism which includes a picking head which moves longitudinally through a predetermined distance along the conveyor, and transversely thereof. A plurality of totes are supported on a platform adjacent and extending longitudinally along at least one side of the conveyor system, with the cells in each tote typically defining a plurality of stacks of different articles all having a preassigned coordinate (i.e., an X-Y coordinate) relative to the movement of the picking head. The computerized controller causes the picking head to remove a desired article from the cell of the specific tote containing such article, with the picking head then moving transversely and longitudinally as necessary so as to thereafter transfer the article for deposit on the preassigned area of the conveyor system. This process can be repeated several times within one subzone, and sequentially within the several serially-arranged subzones, to permit filling of a single order with the desired low and moderate demand articles which are deposited into the preassigned area on the conveyor system. The partially assembled order thereafter moves under the dispensers in the next zone so as to permit addition thereto of any high-demand articles which are contained in the order.

With the improved system of this invention, as summarized above, the totes which are disposed along the order-collecting conveyor system as associated with each subzone can be readily removed and interchanged by means of a storage/retrieval vehicle which effects transfer of totes between the storage racks and the picking areas (i.e. the picking interface). Similar totes are disposed in series along the zone containing the article dispensers, and a replenishment mechanism which is movable transversely and horizontally along this latter zone is provided for removing a stack of articles from one of the replenishment totes and thereafter depositing the stack into an appropriate dispenser.

Other objects and purposes of the invention will be apparent to persons familiar with systems of this general type upon reading the following specification and inspecting the accompanying drawings.

Figure 1:
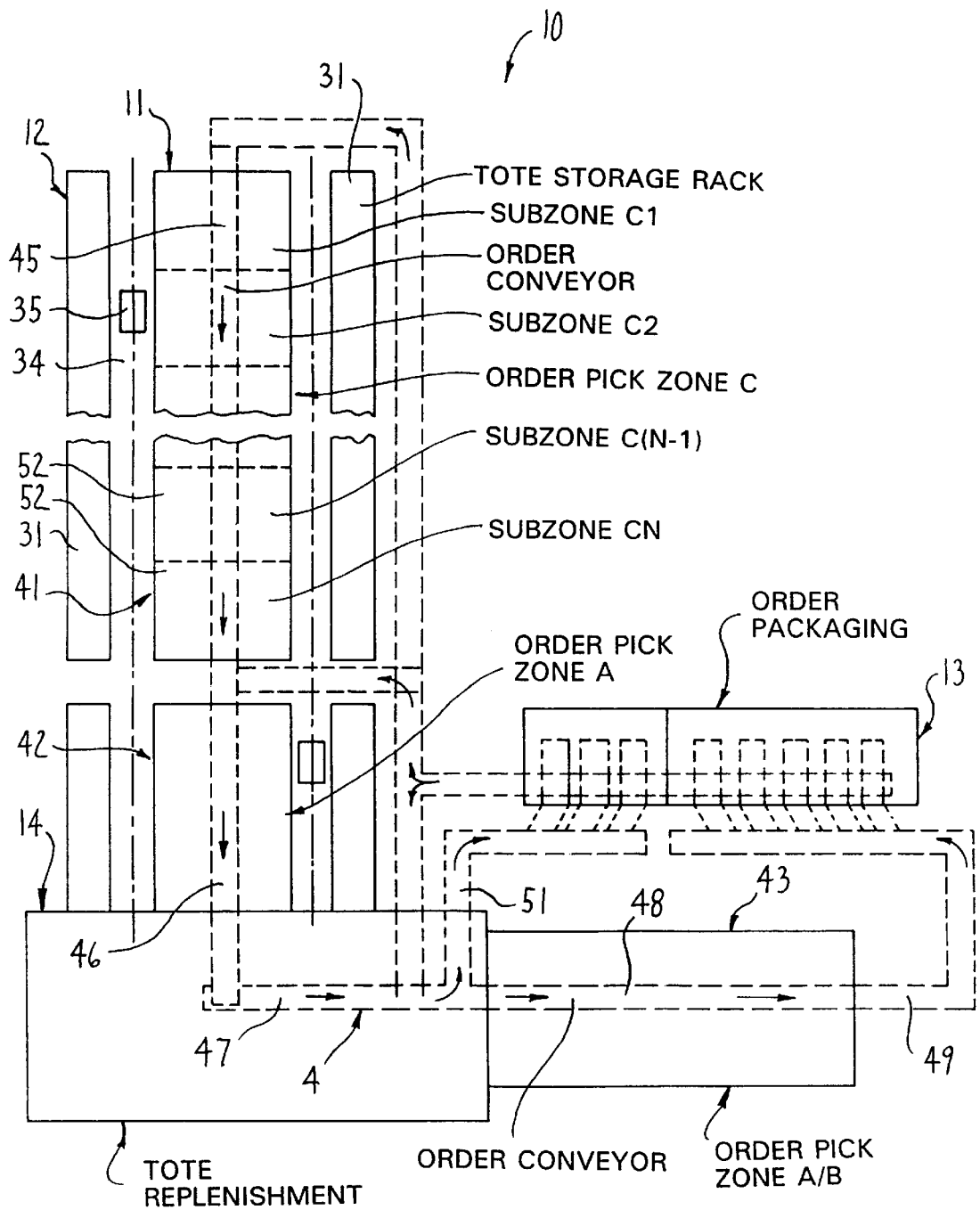
FIG. 1 is a diagrammatic plan view of an article storage and retrieval system, and particularly an automated order picking system, according to a preferred arrangement of the present invention.

Certain terminology will be used in the following description for convenience in reference only, and will not be limiting. For example, the words "upwardly", "downwardly", "rightwardly" and "leftwardly" will refer to directions in the drawings to which reference is made. These same terms will also be used to refer to actual directions of movement of articles during the order pick process. The word "forward" will also be used to refer to the direction of movement of the article as it traverses from the pick stage through the order picking zones to the packaging station. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 2:
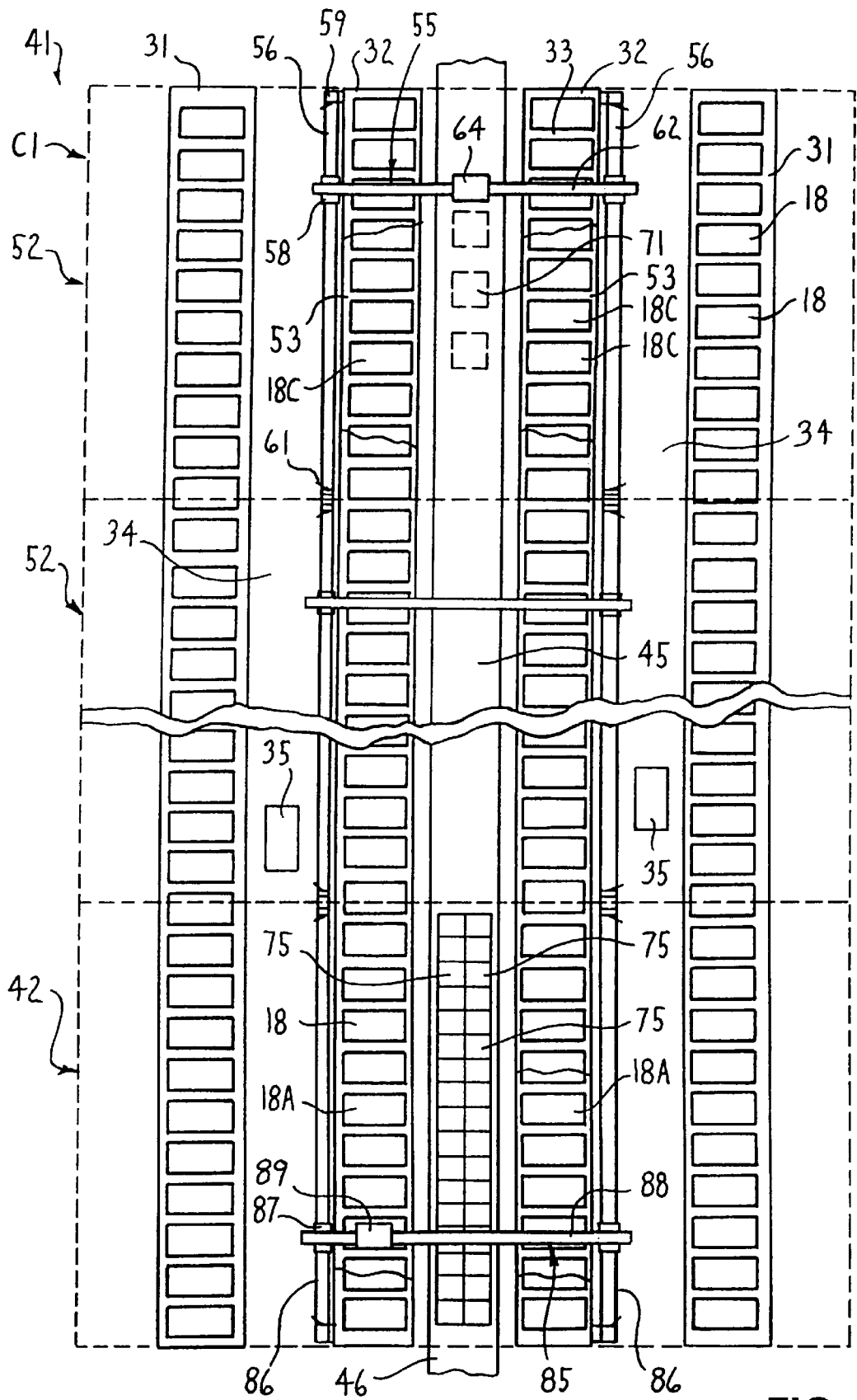
FIG. 2 is a diagrammatic plan view which illustrates, on a larger scale and in somewhat greater detail, the order pick zones C and A of FIG. 1.

Referring to FIGS. 1 and 2 there is diagrammatically illustrated a plan view of an automated storage and retrieval system (ASRS) 10 according to the present invention. This ASRS system 10 includes an order pick system 11 which may herein also be referred to as an automated piece or article picking system. This order pick system 11 cooperates with an article storage arrangement 12. Filled orders from the pick system 11 are typically supplied to a packaging station 13. The overall system also includes a tote replenishment section 14.

Figure 5:
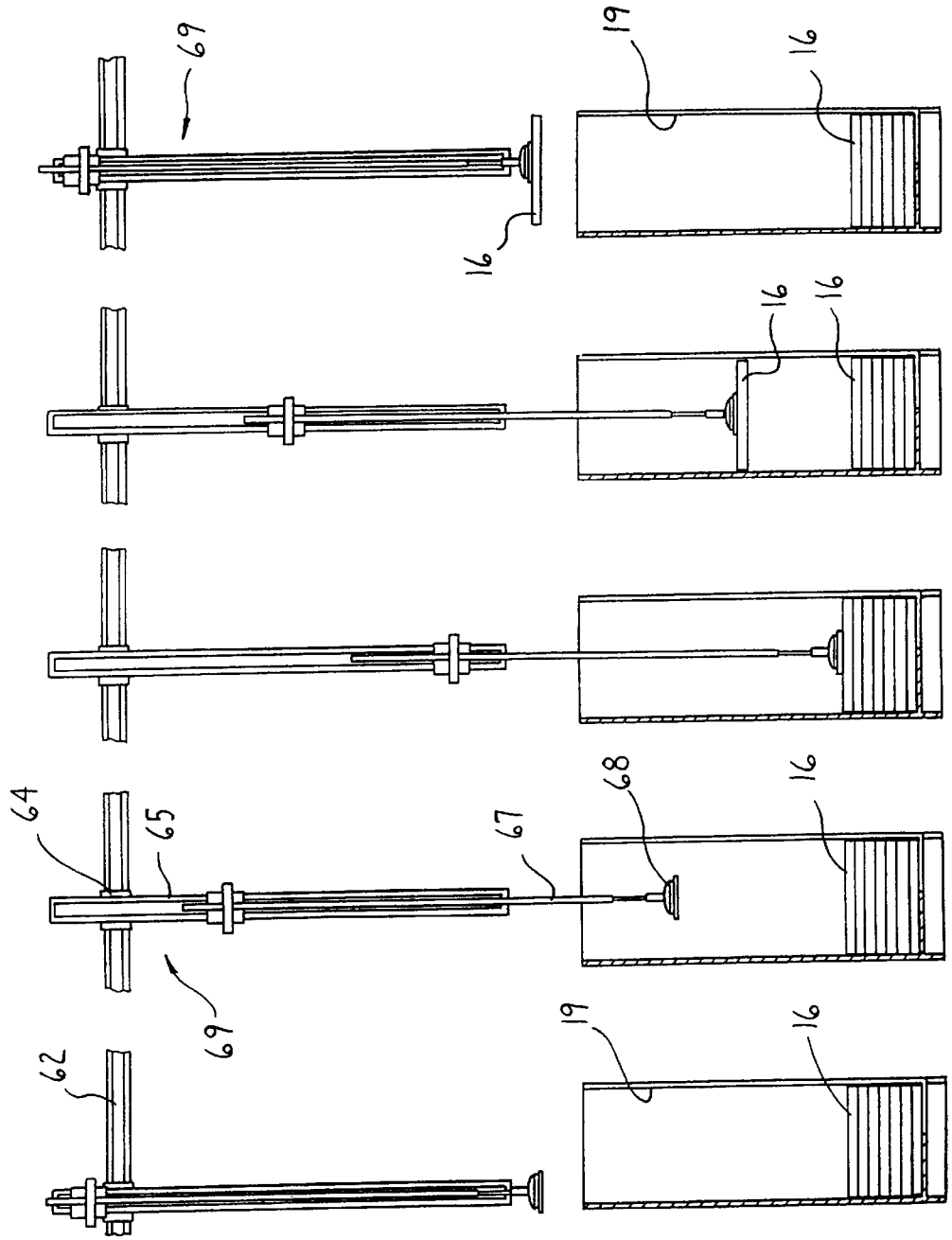
FIGS. 5A–5E illustrate the movement sequence of the pick head associated with the article pick mechanism for removing an individual article from one of the cells of a tote.

In the present invention the individual articles are designated 16 (FIG. 5) but different alphabetic designations may be used in combination therewith (such as 16A, 16B, etc.) to designate different articles. For example, if the articles constitute packaged CDs or the like, then while the physical packaging for each article may dimensionally be the same, nevertheless the contents of the different packages will be different so as to represent the different titles or musical compositions contained on the CDs.

Figure 6:
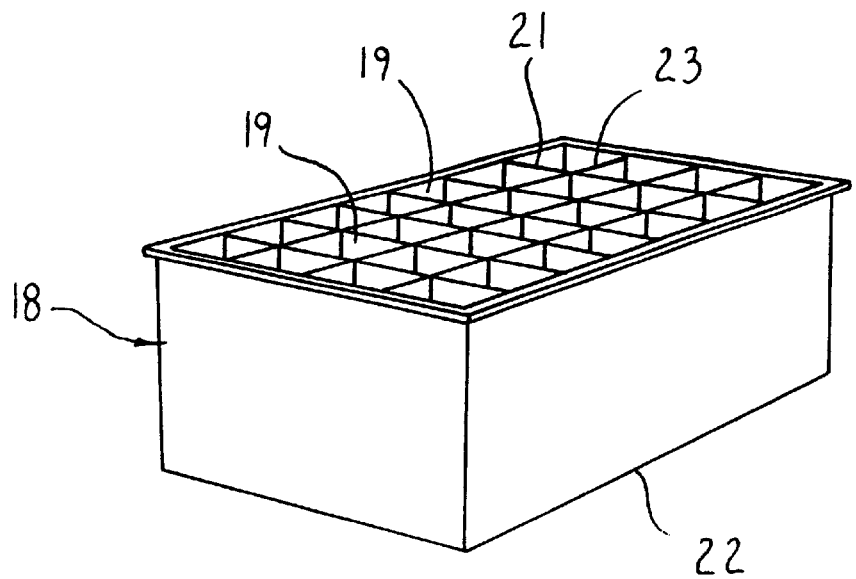
FIG. 6 is a diagrammatic perspective view of a tote which defines therein, in a rectangular gridlike pattern, a plurality of upwardly opening cells each adapted for containing therein a stack of articles.
Figure 9:
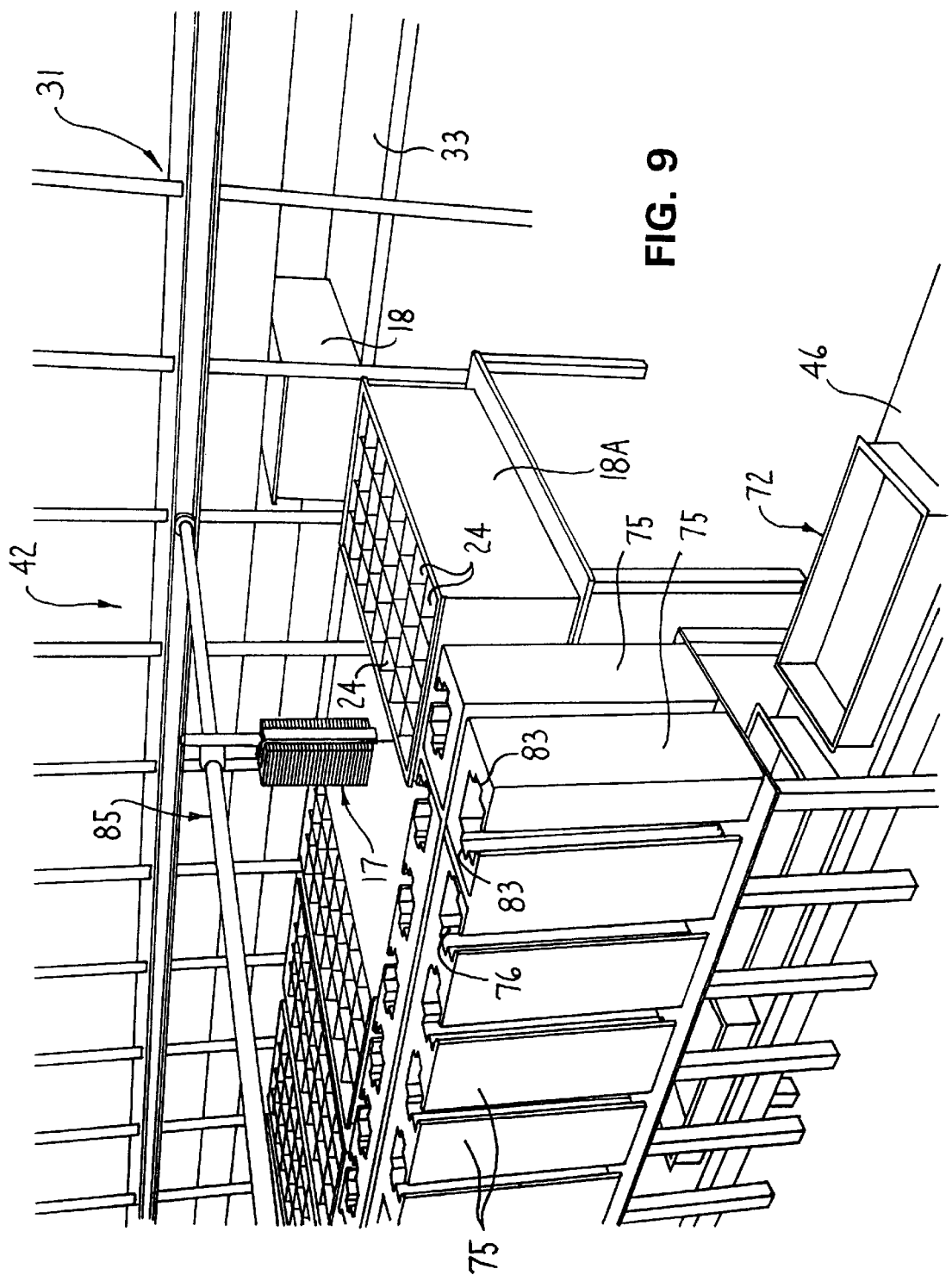
FIG. 9 is a fragmentary perspective view of the pick zone A.

The articles 16 will normally be disposed in vertical stacks 17 (FIG. 9), with all of the articles within an individual stack being identical. The stacks in turn are typically stored and confined within boxlike bins or totes 18 (FIG. 6) which are open on the upper side thereof so as to provide access to a plurality of vertically elongate compartments or cells 19 as defined within the tote. The interior of the tote is defined by transversely projecting first and second partitions 21 and 23 which project upwardly from the bottom wall 22 of the tote so as to divide the interior of the tote into the plurality of cells 19, the latter defining a plurality of adjacent and parallel rows which extend longitudinally in the lengthwise extent of the tote, with each row containing an identical plurality of cells therein. Each cell or compartment 19 is adapted to have a single stack 17 of articles 16 supported in an upright relation therein. The cross section of the compartment is sized so as to closely confine the stack and maintain the desired vertical alignment thereof.

The partitions 21 and 23 are preferably adjustably secured to the perforated bottom wall of the tote to permit adjustability with respect to the size of the cells 19, thereby enabling the totes to be adjusted in accordance with the shape of the article 16. In addition, the one set of partitions, such as the partitions 23, are preferably provided with slots or grooves which project vertically downwardly therealong substantially centrally of the respective side wall of the cell, with a pair of such slots preferably being provided on opposite sides of each cell 18. These slots facilitate the insertion of a transfer head into the tote so as to permit insertion or removal of a stack of articles. This relationship is explained in detail hereinafter.

The article storage arrangement 12 as associated with the overall system 10 includes, in the illustrated arrangement, two pairs of upright storage racks 31–32 (FIG. 3), with the racks 31–32 of each pair being disposed in generally opposed and facing relationship and separated by an aisle 34 which extends therebetween. Each of the storage racks 31–32 is of a generally conventional construction defined by a plurality of generally superimposed but vertically spaced shelves 33 which are horizontally elongate in the lengthwise direction of the respective rack, whereby each shelf 33 can removably support thereon a large plurality of totes 18 which are disposed in generally side-by-side relationship longitudinally along the respective shelf. Each rack thus stores thereon a large number of totes which are disposed in an X-direction, namely horizontally along each shelf, with the totes also being disposed vertically in a Z-direction, that is vertically one above the other due to their support on vertically adjacent shelves.

To permit storage or retrieval of totes 18 with respect to the storage racks 31 and 32, the aisle 34 is provided with a conventional storage/retrieval vehicle 35 associated therewith. Such vehicle 35, as is conventional, includes an upright 36 which is typically provided with rollers at the upper and lower ends thereof which in turn engage guide rails associated with the respective ceiling and floor so as to permit the storage/retrieval vehicle 35 to readily traverse the length of the aisle 34. This vehicle 35 also has a storage/retrieval platform 37 which is movable vertically on the upright so as to be positioned adjacent any storage space along the X-Z dimensions of the rack 31 or 32, with this storage/retrieval platform 37 having a conventional extendible effector associated therewith for permitting insertion of a tote into the rack, or removal of a tote from the rack. This storage/retrieval vehicle 35 is automated and controlled from a central computer for controlling the storage and retrieval of a large number of totes relative to the racks 31 and 32. Numerous types of storage/retrieval vehicles of this general type are conventional and well known, whereby further description of the vehicle 35 for use in the ASRS of this invention is believed unnecessary.

With respect to the order filling (i.e. piece picking) system 11, it includes a series of different picking zones which are individually formatted to permit efficient handling of different articles, such as articles of low demand (i.e., low frequency of selection) in comparison to articles of high demand (i.e., high frequency of selection). For example, the order filling system 11 includes a first pick zone 41 (zone C in FIG. 1) which in the system of this invention is provided to permit picking of low-demand articles (i.e. "C" articles) selected from a large number of different such articles. This pick zone 41 in turn connects serially with a second pick zone 42 (zone A in FIG. 1) which is provided to permit dispensing of high-demand articles (i.e. "A" articles), whereby zone A will typically permit picking from only a significantly smaller number of different articles than is available in zone C. For example, zone C may permit picking from as many as several thousand different articles, whereas zone A will typically permit picking from a number of different articles which is a small fraction of the number of different articles in zone C. For example, zone A may contain only about 100 different articles. Further, the articles available in zone A are typically high-demand articles which are not available in zone C, and likewise the articles in zone C are typically low-demand articles which are not available in zone A.

The ASRS, as illustrated in FIG. 1, also includes a third article pick zone 43 (zone A/B in FIG. 1) which permits picking or selecting of the same high-demand articles contained in zone A (i.e., the "A" articles), but zone A/B also includes and permits picking therefrom of moderate demand articles (articles "B"), the latter in the illustrated arrangement being available solely in this third zone 43.

The pick zones 41, 42 and 43 have a moving order-collecting conveyor system 44 associated therewith, the latter typically being a belt system and including a first moving conveyor 45 which extends through the first pick zone 41, with this first conveyor 45 being generally aligned with and forming an extension with a second moving conveyor 46 which extends through the second pick zone 42. This latter conveyor 46 in the illustrated arrangement connects to an intermediate or third conveyor 47 which extends to the third pick zone 43, with the latter having a fourth moving conveyor 48 extending therethrough. This latter conveyor 48 joins to a terminal conveyor 49 which transfers the orders (i.e., the picked articles) to the packaging station 13. The conveyor system 44 also preferably includes a bypass conveyor 51 which joints to the third conveyor 47 upstream of the third pick zone 43 so as to permit completed orders to bypass the third pick zone and sent directly to the packaging station 13.

The article pick zone 41 (i.e. zone C handling the low-demand "C" articles) is defined by a plurality of subzones 52 which are arranged in series along the conveyor 45 such that a conveyor section extends through each of the subzones. In the general arrangement illustrated by FIGS. 1 and 2 the zone C includes "N" subzones, where N is at least two and more preferably at least three to five, with N as a maximum being determined by the overall demands of the system. For example, N can be as large as 20 or 30 if desired.

Each subzone 52, such as the subzone C1 illustrated in FIG. 2, includes a horizontal support platform 53 which is disposed adjacent at least one side of the respective conveyor section 45 and extends generally longitudinally therealong in sidewardly adjacent but generally parallel relation therewith. Such support platforms 53 are, in the illustrated arrangement, disposed adjacent opposite sides of the conveyor 45. Each of the support shelves or platforms 53 can be defined as part of and generally within the storage rack 32, with suitable tote storage shelves being removed from the rack so as to provide space for the support platform 53. The platform 53 is adapted to support thereon a plurality of article-containing totes designated 18C for permitting picking therefrom of ordered "C" category articles. The totes 18C are arranged generally side-by-side along the length of the platform 53 throughout substantially the longitudinal length of the respective subzone. The totes 18C as supported on the platforms 53 for the respective subzone define the pick face or region for the subzone.

Figure 3:
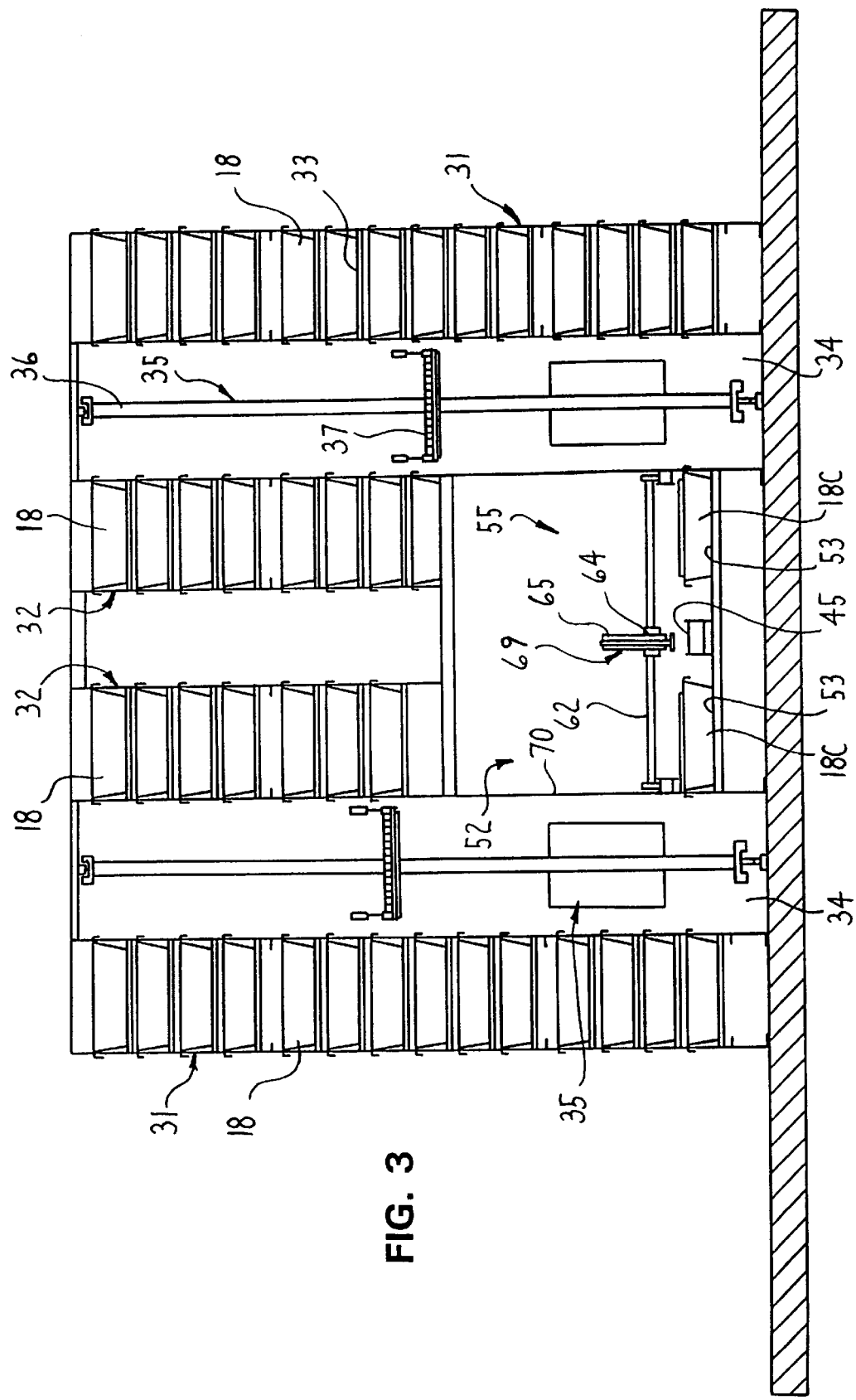
FIG. 3 is a diagrammatic elevational view taken transversely through one of the subzones, such as the subzone of FIG. 2.
Figure 4:
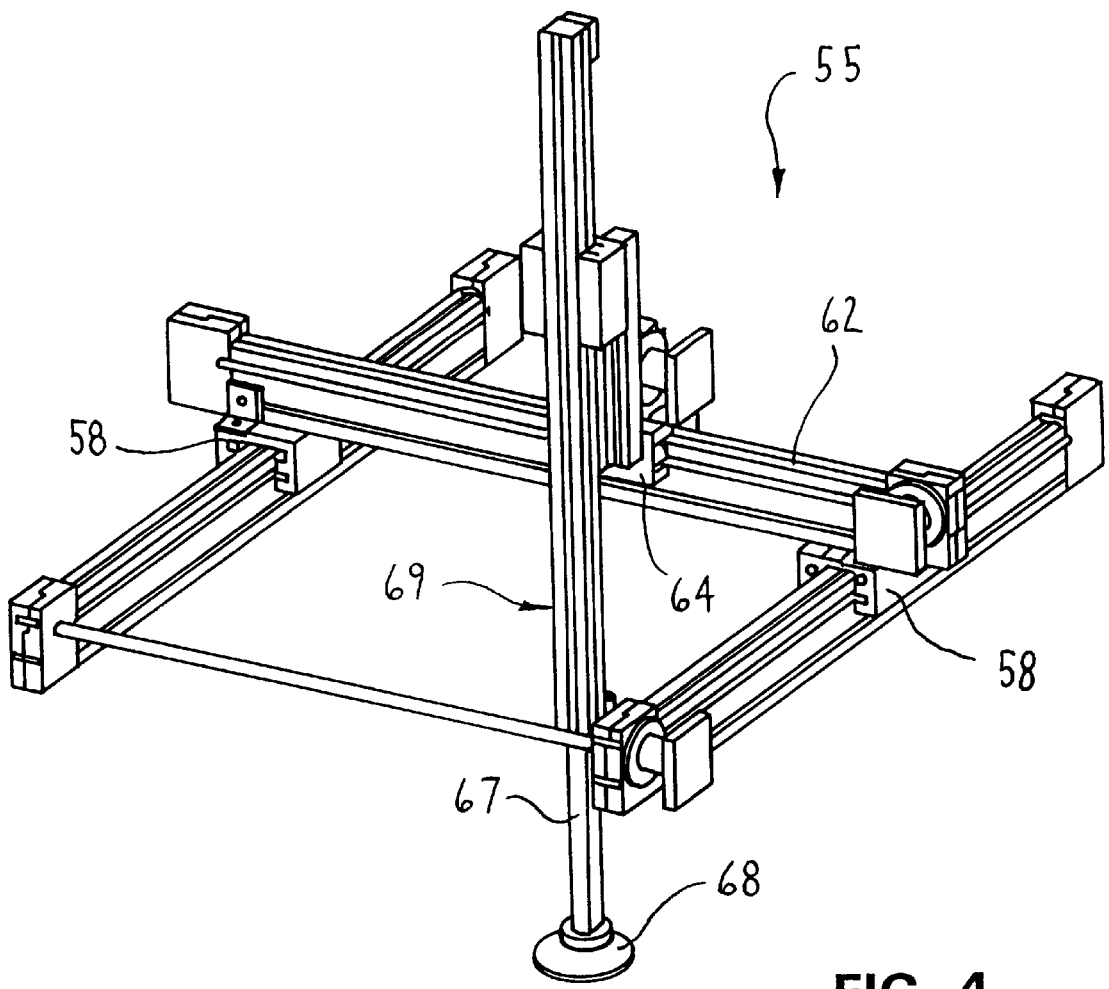
FIG. 4 is a diagrammatic perspective view which illustrates the article pick mechanism as associated with each subzone.

Each order pick subzone 52, such as the subzone C1, contains an article picker 55, specifically a gantry-type article picker mechanism which is capable of picking an individual article from any of the compartments contained in any of the totes 18C within the respective pick face and then depositing the article in a predefined order collecting space or area on the respective conveyor section 45. The gantry-type article picker 55, as illustrated in FIGS. 2–4, is supported on a pair of generally parallel and horizontally extending support rails 56 which are fixedly disposed adjacent and extend horizontally longitudinally along opposite sides of the subzone. These rails 56 are mounted on vertically extending posts 70 and support thereon conventional linear actuators (such as direct drive motors, linear motors, or a timing belt looped around and extending between drive and idler pulleys) which include carriages 58 which are slidable longitudinally along the rail 56. These carriages are movable linearly in a back and forth manner in the X-direction which extends horizontally in the direction of movement of the conveyor 45. The limits of movement of the carriages 58 are defined by sensors 59 and 61 which define the opposite ends of the respective subzone. These carriages 58 in turn mount thereon a transversely extending support rail 62 which is disposed over the totes 18C and over the conveyor 45, which rail 62 also mounts therein another linear actuator which controls movement of a carriage 64 along the rail 62, which carriage 64 thus moves transverse to the direction of conveyor movement, this being the horizontal Y-direction. The carriage 64 includes a vertically elongate guide rail 65 fixed thereto which in turn carries a further linear actuator which joins to a vertically elongate actuator rod 67 for permitting this actuator rod 67 to be vertically lowered and contracted (i.e. the Z-direction of movement). The actuator rod 67 at its lower free end mounts thereon a pickup element 68, such as a suction cup in the illustrated and preferred embodiment, the latter being coupled through a conduit or hose (not shown) to an appropriate suction source with appropriate valving being provided so as to permit prompt control over the creation and release of a suction within the cup 68. The carriage 64 as well as the linear actuator provided thereon, actuator rod 67 and pickup element 68 conjointly cooperate to define a picking head 69 for the pickup and transfer of a selected individual article 16.

The general construction of the gantry-type mechanism 55 so as to provide the desired movements in the X-Y-Z directions is conventional, and one example of a gantry possessing such movements is manufactured by Macron Dynamics, Inc. and employs the Macron Linear Drive System.

Each of the subzones 52 associated with the first pick zone 41 is constructed generally similar to the zone C1 described above, and includes its own moving pick head 69 which cooperates with its own collection of article-supply totes 18C which are positioned longitudinally along one or both sides of the respective conveyor section for defining the respective pick face.

To receive the picked articles, the controller for the entire system assigns specific order-receiving areas 71 in spaced relation longitudinally along the conveyor system, which spaced order-receiving areas 71 exist as the conveyor system enters the first pick zone 41. Each of these order-receiving areas 71 is associated only with a single order. Thus, as the conveyor moves through the pick zones, the individual articles making up the respective order are picked from the respective zone and deposited into the respective order-receiving area 71.

While the picked articles can be deposited directly in the area 71 as defined by the upper surface of the conveyor, such as the upper surface of the conveyor belt when the conveyor belt moves through the pick zone C, it is possible to also utilize separate order-receiving bins 72 which are respectively positioned at the individual order-receiving areas 71, which bin in turn receives the picked articles for the respective order therein. Such bins 72 (FIG. 9) provide for better captivation of the articles defining the order, and provide for ease of handling of the order and the transfer thereof through the various pick zones until reaching the packaging station.

Considering now the second article pick zone 42 (i.e., zone A in FIG. 1), the latter is provided so as to contain a more limited selection or number of different articles, which articles are generally referred to as the high-demand articles in that they are requested on a significantly greater number of orders. The order pick zone A thus possesses the ability to dispense a significantly greater quantity of each of the different types of articles contained within this zone.

Figure 10:
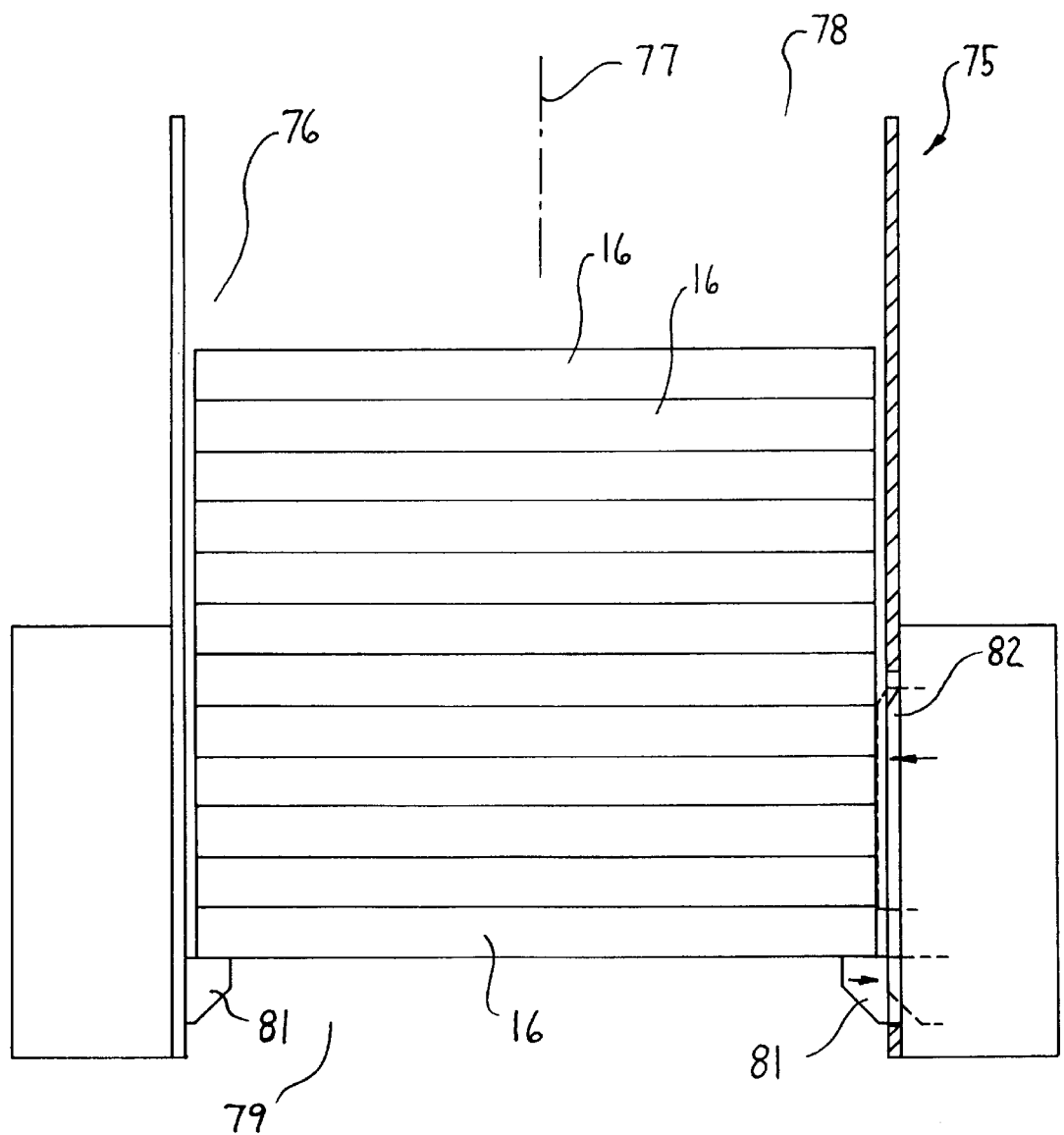
FIG. 10 is a diagrammatic fragmentary sectional elevational view of the dispenser of FIG. 9.

For this purpose, pick zone A includes a plurality of article dispensers 75 which are disposed generally in two side-by-side rows which extends longitudinally along the respective conveyor 46, with these dispensers being positioned generally above and projecting upwardly relative to the conveyor. Each dispenser 75 (FIG. 10) includes a generally upright body which defines therein a vertically elongate compartment or cell 76 which is configured generally similar to the compartments 19 defined within the totes so that each dispenser compartment 76 supports therein a vertically extending stack of identical articles. This compartment 76 is oriented with its longitudinal axis 77 extending generally vertically, and the compartment 76 terminates in an open upper end 78 which permits a stack of articles to be inserted into the compartment. This latter compartment 76 also terminates in an open lower end 79 which functions as a dispensing or discharge end for articles, with this open lower end 79 being positioned directly over in adjacent but slightly upwardly spaced relation relative to the upper surface of the conveyor 46. The dispensing end 79 is preferably disposed at an elevation so that it is sufficiently elevated above the upper conveyor surface to enable passage of order-receiving bins 72 therebeneath.

The dispenser 75, adjacent the dispensing end thereof, has a pair of retractable dispensing pawls 81 which project inwardly from opposite sides thereof to supportingly engaging the stack of articles by engaging the lower side of the lowermost article. A pair of grippers 82 also project inwardly of the compartment from opposite sides thereof for engaging opposite sides of the stack of articles, which grippers are spaced upwardly from the pawls 81 so as to initiate gripping with the second lowermost article, with the grippers projecting upwardly therefrom. The grippers 82 thus do not engage the lowermost article. The dispensing pawls 81 are activated in a conventional manner, as by solenoids or the like, and the grippers 82 can be similarly suitably actuated, with the timing of the actuation of the pawls 81 and grippers 82 being controlled from the central controller. The stack of articles is normally supported by the dispensing pawls 81. When the controller signals that an article is to be dispensed into a selected order-receiving bin, then the holding grippers 82 are activated and extended inwardly to grip the stack, and substantially simultaneously the dispensing pawls 81 are retracted so as to permit the lowermost article to freely fall from the dispenser into the order collecting bin 72 as the latter passes beneath the dispenser. The pawls 81 are then returned to their extended position, the grippers 82 are disengaged from the stack, and the stack then moves downwardly so as to again be supported on the dispensing pawls.

Numerous types of dispensing mechanisms can be provided for controlling dispensing of the lowermost article from the dispenser 75, such dispensing mechanisms being conventional, and further detail description thereof is believed unnecessary.

The high-demand article pick zone A also includes means for permitting automated replenishment of the high-demand articles A to the individual dispensers 75. For this purpose the pick zone A also includes generally horizonal support platforms 84 which are disposed adjacent and extend longitudinally along at least one side of the conveyor 46, such platforms 84 being disposed adjacent both sides of the conveyor 46 in the illustrated embodiment. These platforms 84 can be formed as a part of the storage rack 32, or in the alternative can be totally separate platforms, and hence these platforms 84 structurally and functionally cooperate in a manner similar to the platforms 53 associated with pick zone C.

The platform 84 in zone A support thereon a plurality of article-containing totes as designated 18A in FIG. 2, which totes are disposed in side-by-side relationship longitudinally along the length of the platform so as to be positioned directly adjacent one side of the dispensers 75. Each of the totes 18A includes therein stacks of identical articles, with each tote typically initially being filled with stacks which are either all of the same article or which constitutes stacks representing only a small number of different articles, such as typically no more than about four different articles. These totes 18A thus contain therein stacks of articles which are disposed in close proximity to the dispensers 75 and hence provide an inventory of such articles which can be readily provided so as to replenish the stacks of articles within the dispensers 75.

Figure 11:
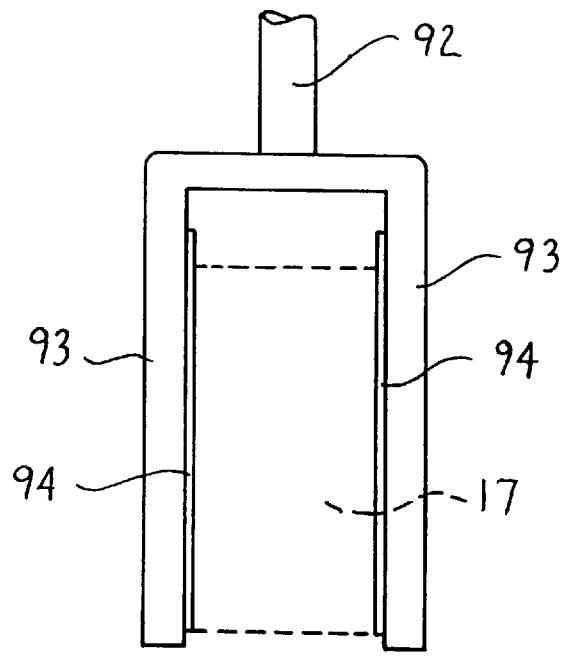
FIG. 11 is an enlarged fragmentary view of the stack holding and transfer head associated with the stack transfer mechanism for filling the dispensers of zone A.
Figure 7:
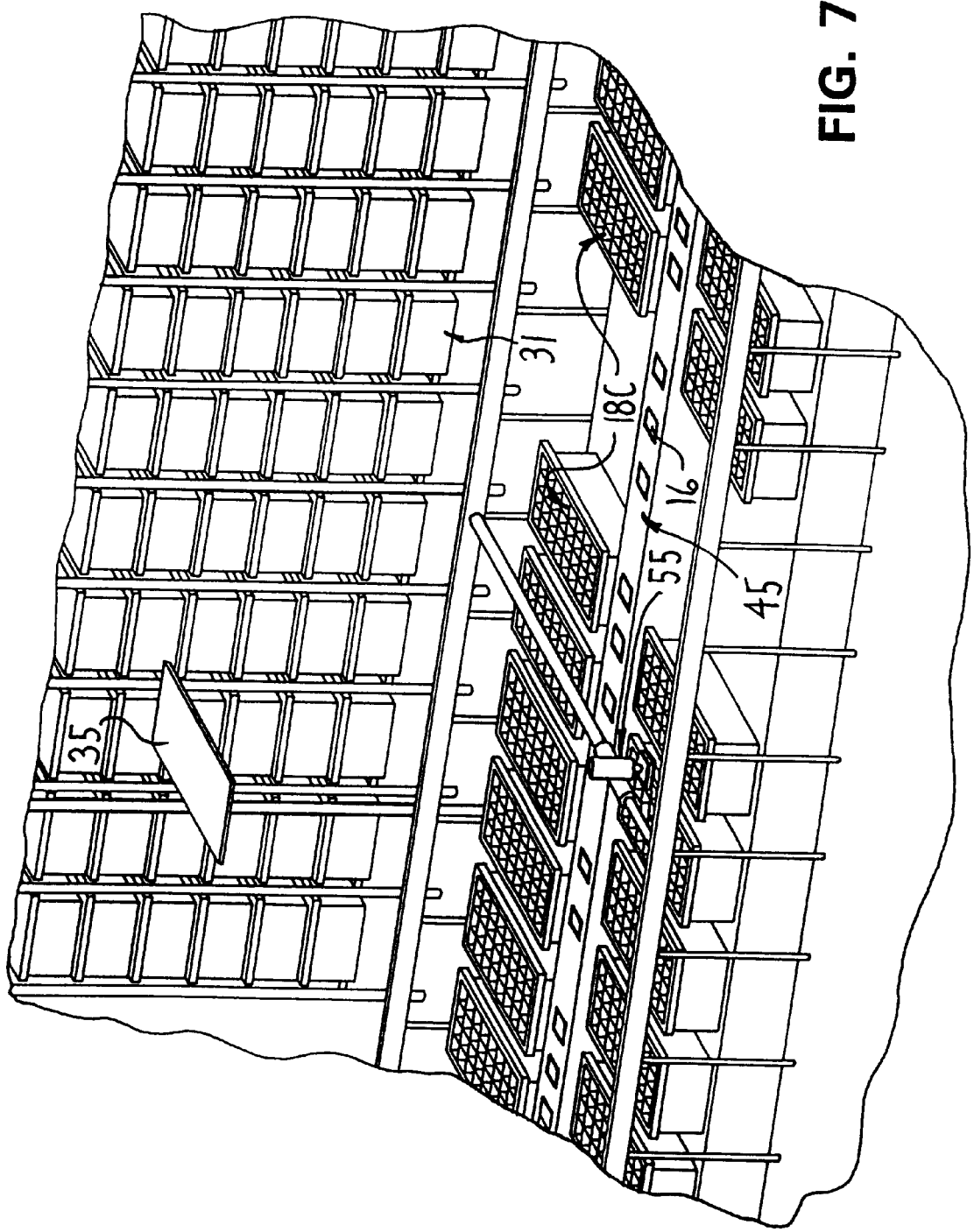
FIG. 7 is a fragmentary perspective view which illustrates the order-picking totes of a subzone as disposed adjacent opposite sides of the collecting conveyor, and which in the background illustrates a tote storage rack and one of the tote-transfer vehicles associated therewith.
Figure 8:
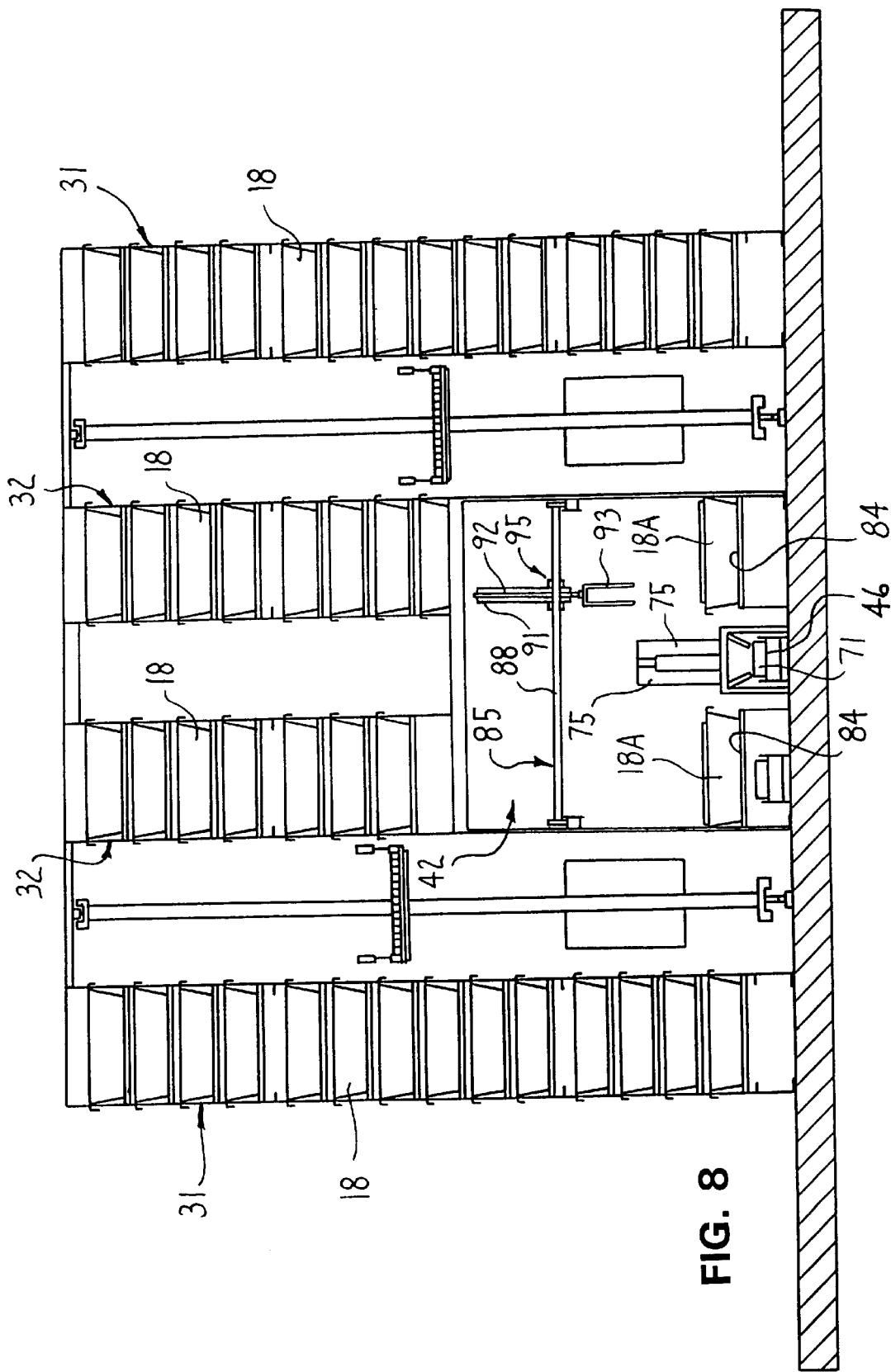
FIG. 8 is an elevational view taken transversely through the pick zone A of FIG. 2.

To permit the replenishment of stacks of articles to the dispensers 75 on an as-needed basis, the pick zone A includes a gantry-type article transfer mechanism 85 (FIGS. 2 and 8) which mounts thereon a transfer head 95 which is movable horizontally longitudinally, horizontally transversely and vertically (i.e., movable in the X-Y-Z coordinates) to effect transfer of a stack of articles from a selected tote 18A to a selected dispenser 75. This gantry-type transfer mechanism 85 is structurally and functionally similar to the gantry-type article picker 55 described above in that the mechanism 85 again concludes generally horizontally extending side rails 86 which extend longitudinally and are stationarily mounted adjacent and spaced upwardly from the outer sides of the platforms 84, which rails contain therein appropriate linear actuators which control the linear movement of carriages 87 longitudinally therealong. The latter carriages 87 are joined by a further rail 88 which extends horizontally and transversely therebetween so as to extend over the totes 18A and over the upper ends of the dispensers 75. This transverse rail 88 also contains therein an appropriate linear actuator which controls the linear movement of the further carriage 89 along the transverse rail 88. This carriage 89 is part of and mounts thereon the transfer head 95, the latter including a vertically elongate guide rail 91 which is fixed to the carriage 89 and which mounts thereon a further linear actuator which connects to a transfer member 92 which is vertically slidably supported on the guide rail 91. The transfer member 92 has a generally downwardly-projecting yokelike configuration which includes a pair of generally parallel and vertically downwardly cantilevered side arms 93 which are sidewardly spaced apart by a distance which slightly exceeds the width of a stack of articles. These side arms 93, on the inner sides thereof, have expandable grippers 94 (FIG. 11) extending vertically therealong, such as conventional pneumatically expandable grippers, the latter being supplied with pressurized air through a suitable conduit or passage (not shown) for controlling expansion and contraction thereof.

The gantry-type article transfer mechanism 85 is controlled from the central controller so as to move the transfer head 95 to the desired X-Y position to dispose the transfer head 95 directly over a selected stack within a selected tote 18A, whereupon the transfer head 95 is activated to move the transfer member 92 vertically downwardly so that the side arms 93 project downwardly into the slots 24 (FIG. 9) in the tote 18A in straddling relationship to the stack contained in the selected compartment. The grippers 94 are then activated to grip opposite sides of the stack, and the transfer mechanism 92 is then lifted vertically upwardly so as to remove the stack of articles from the tote. In this latter position the gantry mechanism is again activated to move the transfer head in the X-Y plane until the transfer head 95 is disposed directly over the selected dispenser 75, at which time the transfer member 92 is again vertically extended downwardly to move the stack downwardly into the respective compartment 76. During this downward movement into the dispenser the side arms 93 are accommodated by the slots 83 defined on opposite sides of the compartment 76. When the lowermost article on the stack carried by the transfer head 95 engages the remaining uppermost article contained in the dispenser compartment, further downward movement is sensed and stopped, the side grippers 94 are then released to disengage the stack, and the transfer member 92 is then again retracted upwardly out of the dispenser so as to be available to permit transfer of a further stack to another dispenser.

Considering now the third article pick zone 44 (i.e. the pick zone A/B in FIG. 1), this zone is provided so as to provide additional order pick capability with respect to the same high-demand articles A as supplied in zone A. The zone A/B, however, also has the capability of supplying additional articles, namely those of moderate demand (i.e., moderate frequency of selection) which are herein referred to as the "B" articles, these B articles being different from the articles supplied in either zone A or zone C.

Figure 12:
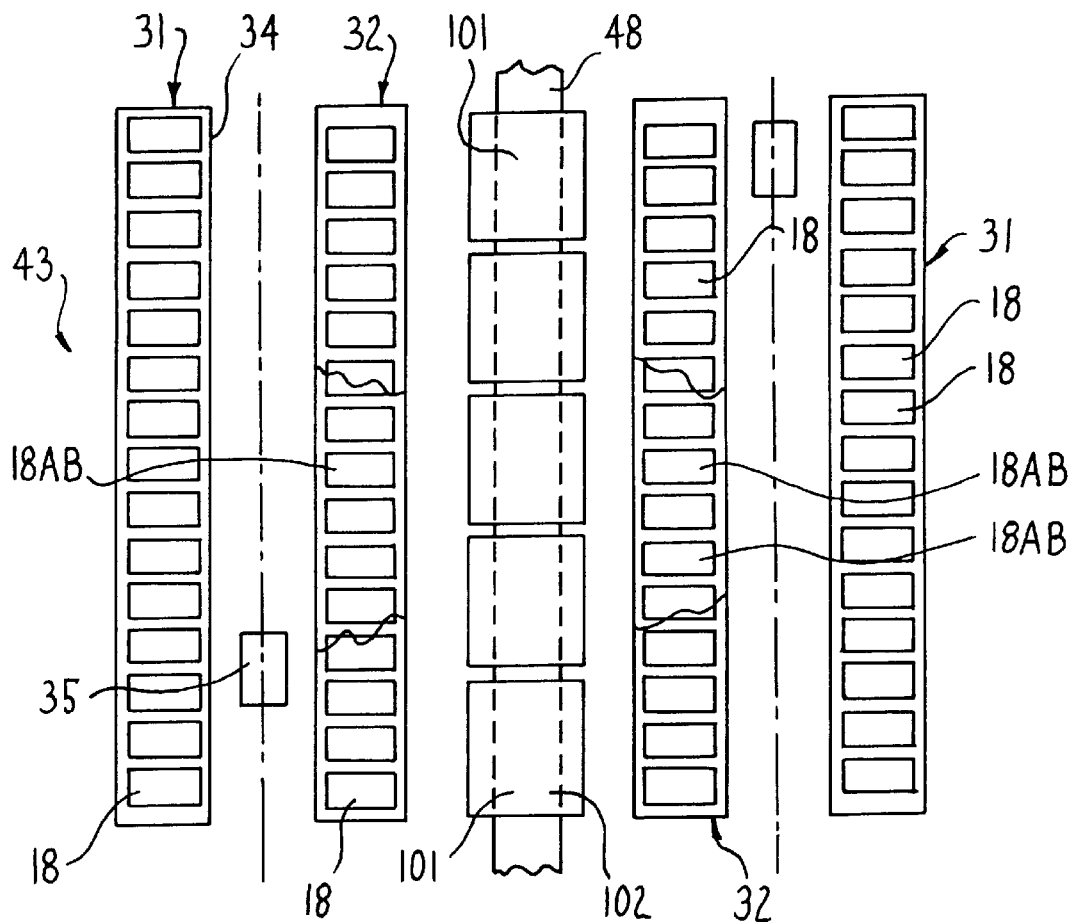
FIG. 12 is an enlarged diagrammatic plan view of the order pick zone A/B of FIG. 1.
Figure 13:
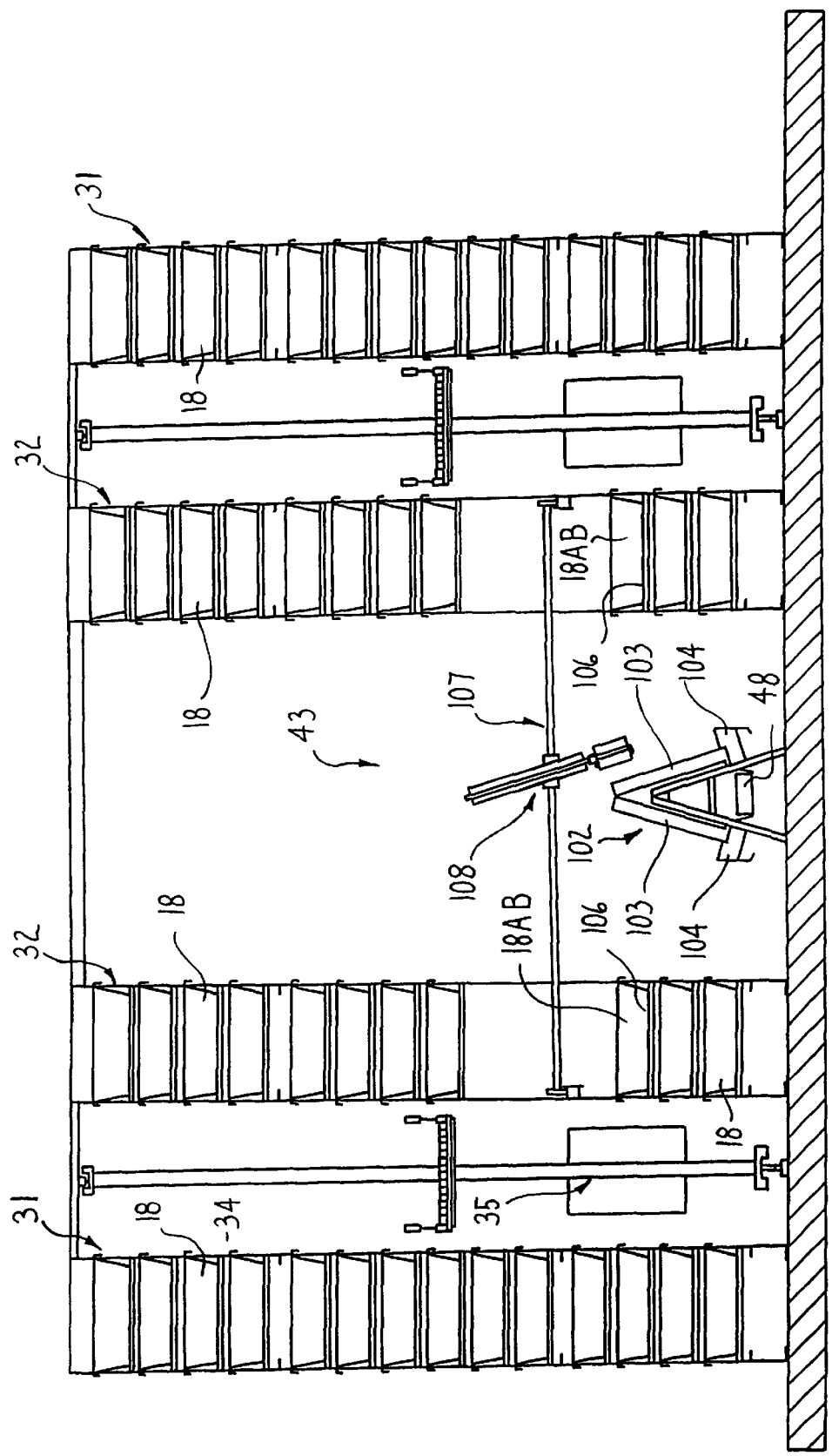
FIG. 13 is an elevational view taken transversely through the order pick zone A/B of FIG. 12.

Since zone A/B supplies both high and moderate demand articles A and B respectively, the zone A/B (FIGS. 12 and 13) is also provided with two rows of generally side-by-side (i.e., back-to-back) dispensers 101 which extend longitudinally along the conveyor 48 which extends through this zone. The dispensers in zone A/B may be of the type represented by the dispensers 75 of zone A (commonly referred to as Bombardier-type dispensers), or in the alternative may be A-frame dispensers 102 as illustrated in FIG. 12. Such A-frame dispensers are conventional, and are illustrated in U.S. Pat. No. 5,271,703. The A-frame dispensers 102 include a generally upright A-shaped frame which is disposed upwardly in straddling relationship to the article-collecting conveyor 48. Each side leg of the A-frame provides thereon, in longitudinally sidewardly adjacent relationship, a plurality of upwardly projecting slots or compartments 103 each containing a stack of identical articles therein, with the dispensing of the lowermost article from the stack being controlled by an automated dispensing mechanism 104 which displaces the lowermost article sidewardly onto a guide chute which then guides the article downwardly into the appropriate order-receiving bin 72 as the latter passes through the A-frame. Alternately, the article can be deposited directly onto the designated space 71 on the conveyor belt, although collection of articles within the collecting bin 72 is preferred.

The various article-containing slots or compartments 103 associated with each of the side legs of the A-frame typically individually contain therein stacks of identical articles, with the various compartments containing different articles, such as different A or B type articles. To permit replenishment of the articles within the compartment of the A-frame, the article pick zone A/B also has support platforms 106 associated with and extending longitudinally along one, and in the illustrated embodiment along both, sides of the A-frame in generally parallel relationship with the conveyor 48. Each of these platforms 106 supports thereon a plurality of article-containing replenishment totes 18AB each containing therein stacks of the A and/or B type articles contained within the A-frame dispensers. The stacks of articles can be transferred from the totes 18AB to the compartments of the A-frame dispensers by one or more gantry-type transfer mechanisms 107 which are identical to the transfer mechanism 85 described above except that the transfer mechanism 107 associated with the A-frame additionally permits the transfer head 108 to vertically pivot about a longitudinally extending horizontal pivot axis, whereby the transfer head can be disposed in a slight angular orientation so as to permit alignment with either side of the A-frame to permit the head to transfer a carried stack downwardly into a respective compartment 103 of the A-frame dispenser. Other than this permissible pivoting of the transfer head, this transfer mechanism otherwise structurally and functionally corresponds to the transfer mechanism 85 described above and hence permits automated transfer of stacks of articles from the replenishment totes 18AB to the individual compartments 103 of the A-frame dispenser 102 to permit replenishment of articles therein.

The pick zone A/B is also preferably provided with storage racks 31, 32 disposed in sidewardly spaced and parallel relationship and extending along each side of the A-frame zone, which storage racks again permit storage of a large number of totes thereon, with the totes being supplied to or retrieved from the storage racks by an appropriate storage/retrieval vehicle 35 which moves longitudinally along the aisle 34 between the racks. This storage rack arrangement and the storage and retrieval of totes therefrom is generally the same as the storage rack and retrieval arrangement associated with the zones A and C described above.

The tote replenishment station 14 illustrated in the arrangement of FIG. 1 is reused so as to be disposed over the conveyors which transfer between the zones A and A/B. This thus enables the totes to be resupplied with articles, with the filled totes then being returned via the storage/retrieval vehicles 35 to the storage racks 31–32 as associated either with the zones A and C, or the zone A/B.

Figure 14:
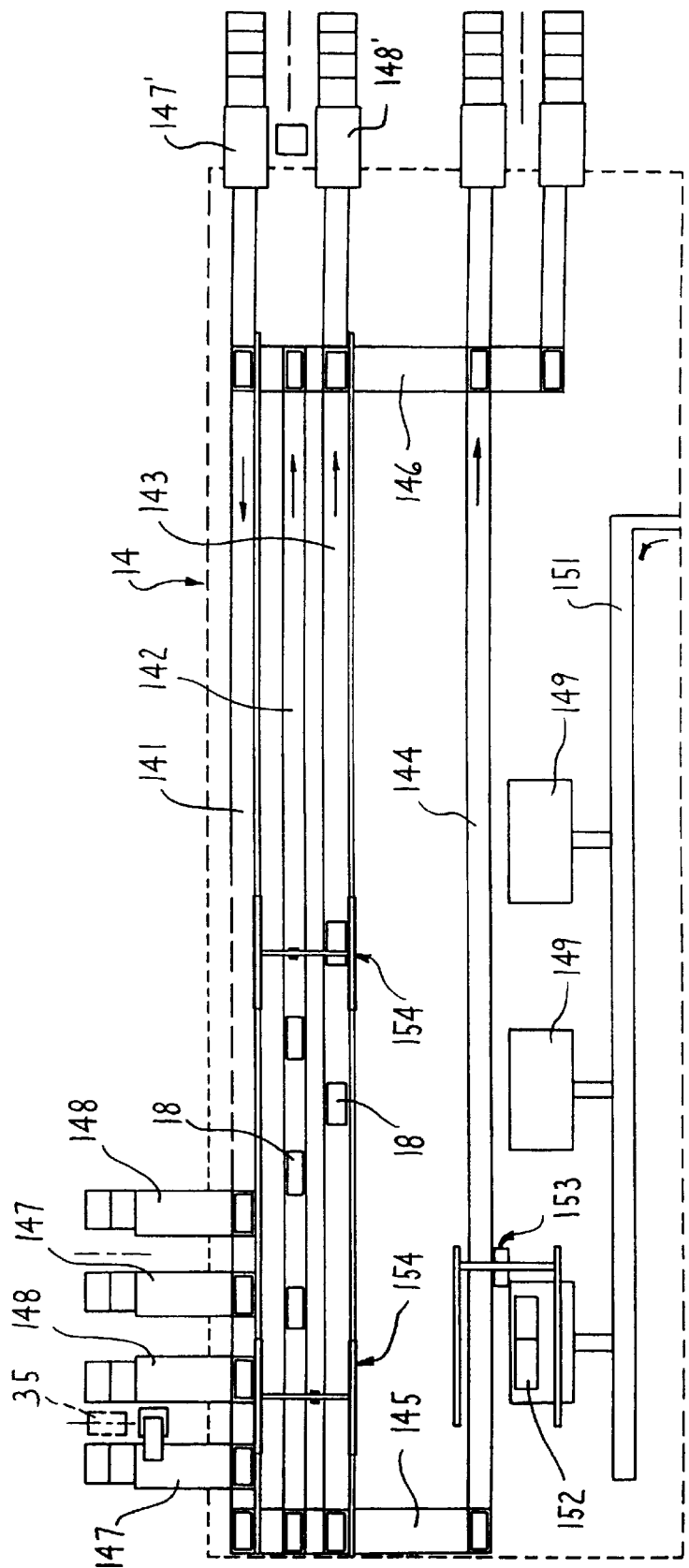
FIG. 14 is an enlarged diagrammatic plan view of the tote replenishment area of FIG. 1.

More specifically, and referring to FIG. 14, this diagrammatically illustrates the tote replenishment station 14. This latter station includes a series of generally parallel tote conveyors 141, 142, 143 and 144 which are joined by cross or end conveyors 145 and 146, with these conveyors where they intersect being provided with conventional transfer mechanisms which enable selection as to the direction of tote movement. The conveyor 141 has two pairs of transfer branch conveyors 147–148, with each pair being associated with one end of the aisle 34 which extends between adjacent pairs of racks 31–32 for permitting the storage retrieval vehicle 35 which moves between the racks to readily transfer totes to or from either of the branch conveyor 147–148. When totes are returned from the storage racks 31–32, they flow along the conveyors 141 and 145 to the conveyor 144 which moves past loading stations 149, the latter being supplied via an input conveyor 151 with large cartons which contain large numbers of articles therein. At the loading station 149 the cartons are manually unloaded and the articles are formed into stacks which are supported on a stack former 152. The stacks on the former 152 are then transferred into empty cells of a tote located on the conveyor 144 by an appropriate three-dimensional transfer mechanism 153, which mechanism can be a gantry-type mechanism identical to the transfer mechanisms 85 described above.

The totes which are filled at the loading stations 149 are normally filled entirely with identical articles and, if desired, the filled totes can then be transferred via the branch conveyors 147 or 148 back to the storage/retrieval vehicles 35 so as to be returned to one of the racks 31–32 for storage. Alternatively, the totes can be transferred onto the branch conveyors 147'–148' for storage in the racks 31–32 associated with the zone A/B.

In situations where it is desired to position stacks of different articles within a single tote, such as a tote for use as an order pick tote for zone C or as a replenishment tote containing "B" articles for the zone A/B, then in such case a supply tote containing identical articles can be transferred onto and moved along the conveyor 143, and an order or replenishment tote can be transferred onto and moved along the adjacent and parallel conveyor 142. The three-dimensional transfer mechanisms 154, which are effective for transferring stacks of articles and can be identical to the transfer mechanism 85 described above, then effect transfer of stacks of articles from the totes on the conveyor 143 into the totes on the conveyor 142 so as to permit the order picking or replenishment totes on conveyor 142 to be created with the desired quantity and mix of different articles. The order picking or replenishment totes leaving the conveyor 142, when filled as desired, are then returned to the branch conveyors 147–148 or 147'–148' for engagement with the appropriate storage/retrieval vehicle 35 which then stores the tote in an assigned space in one of the racks 31–32, whereby the tote is thus available for subsequent transfer to the appropriate pick zone when needed. The replenishment or order pick tote can be cycled in a loop along the conveyors 141 and 142 several times if necessary in order to permit the proper quantity and mix of stacks of articles to be transferred into the tote as it moves along the conveyor 142. This overall operation is fully automated and controlled by the master controller.

Referring now to FIGS. 15–18, there is illustrated a preferred construction of a tote for use in conjunction with the system of this invention. The preferred tote, designated 18', includes a generally shallow base container 111 defined by a base wall 112 having an upwardly projecting edge wall 113. The base container 111 supports therein a removable sheetlike bottom wall 114 which overlies the base wall 112. The removable bottom wall 114 has a large plurality of openings 115 extending vertically therethrough, which openings are defined in rows and columns so as to resemble a generally rectangular grid. To define the actual upwardly-opening cells or compartments 19', a plurality of upright dividers 116–119 are fixedly secured to and project upwardly from the bottom wall 114. This plurality of dividers includes center dividers 116, edge dividers 117 and 118, and corner dividers 119. Four such dividers cooperate to define the four corners of one of the upright compartments 19', the latter being indicated by dotted lines in FIG. 16.

The center divider 116 includes a pair of generally parallel upright walls 121 rigidly joined in spaced relation by transverse walls 122. These parallel walls 122 also have a pair of corner-defining transverse walls 123 joined to the center of the parallel walls 121 and projecting in cantilevered relationship horizontally therefrom. The walls of the center divider 116 define a plurality of enlarged hubs 124 at the lower edges thereof, which hubs align with openings 115 provided in the bottom wall 114 so as to permit fasteners such as screws 125 to project upwardly through the bottom wall for securement with the hubs.

The one edge divider 118 generally approximates one-half the center divider 116 in that it again includes a pair of cantilevered corner-dividing transverse walls 126 which join to and project outwardly from opposite sides of a pair of spaced parallel upright walls 127, the latter projecting solely in one direction relative to the corner-dividing walls 126.

The other edge divider 117 has a cantilevered corner-dividing edge wall 128 which joins to a wall 129, this corresponding to one of the parallel walls 121 of the center divider. These walls 128, 129 thus effectively define a generally T-shape cross section, although the wall 129 also has rearwardly projecting flanges or walls 131 to provide additional support and stability.

The corner divider 119 again resembles a T-shape cross section and is defined by transversely extending walls 132 and 133.

All of the dividers have hubs at the lower edges thereof which accommodates screws which project upwardly through the bottom wall, similar to the construction provided on the center divider 116 as described above.

The dividers can be adjustably positioned relative to the bottom wall 114 in increments which correspond to the spacing between the holes 115 so as to permit the shape and size of the cells 19' to be suitably and easily adjusted in accordance with the shape and size of the article being stacked in the tote. Not only can the shape and size of the cells 19' and the number thereof be suitably adjusted, but this improved construction of the tote also permits the dividers to be positioned so that a single tote can define therein cells having different shapes and/or sizes so as to accommodate different sized and/or shaped articles.

The construction of the tote 18', as illustrated in FIGS. 15–18, also includes a plurality of bottom support channels 135 which are disposed in sidewardly spaced but parallel relationship on the bottom wall 114, with these channels extending longitudinally across one of the width dimensions of the tote. These channels are disposed in a downwardly opening orientation and are disposed so as to extend along an aligned row of cells 19' so that the base or bight of the channel 135 defines the bottom wall of the cell for supporting the lowermost article in slightly upwardly spaced relation relative to the bottom wall 114. The channel 135 is fixed to the bottom wall 114 by some of the screws 125 which project through edge flanges provided at the lower ends of the channel side legs.

Figure 15:
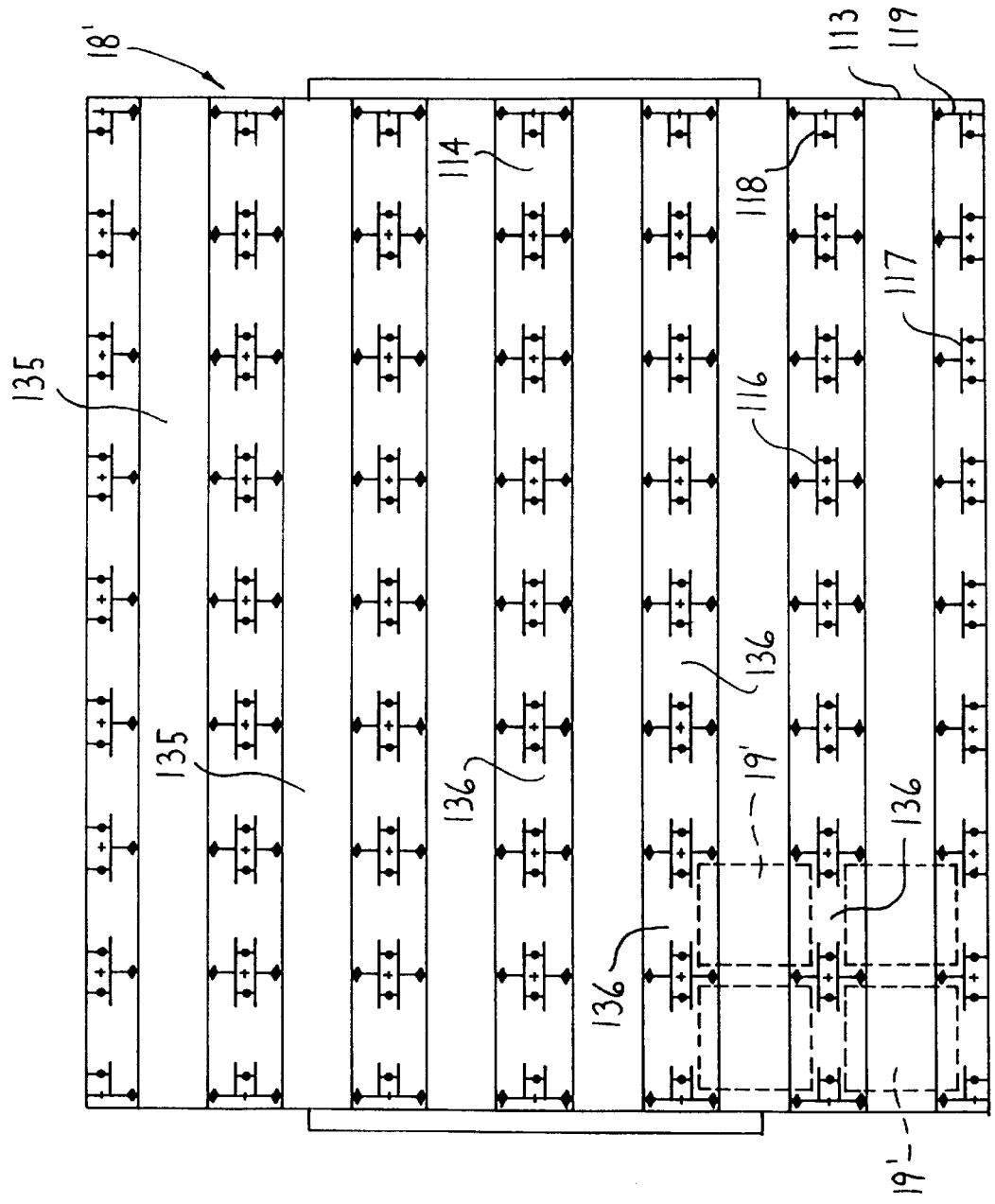
FIG. 15 is a top view of an improved tote for use in the system of this invention.
Figure 16:
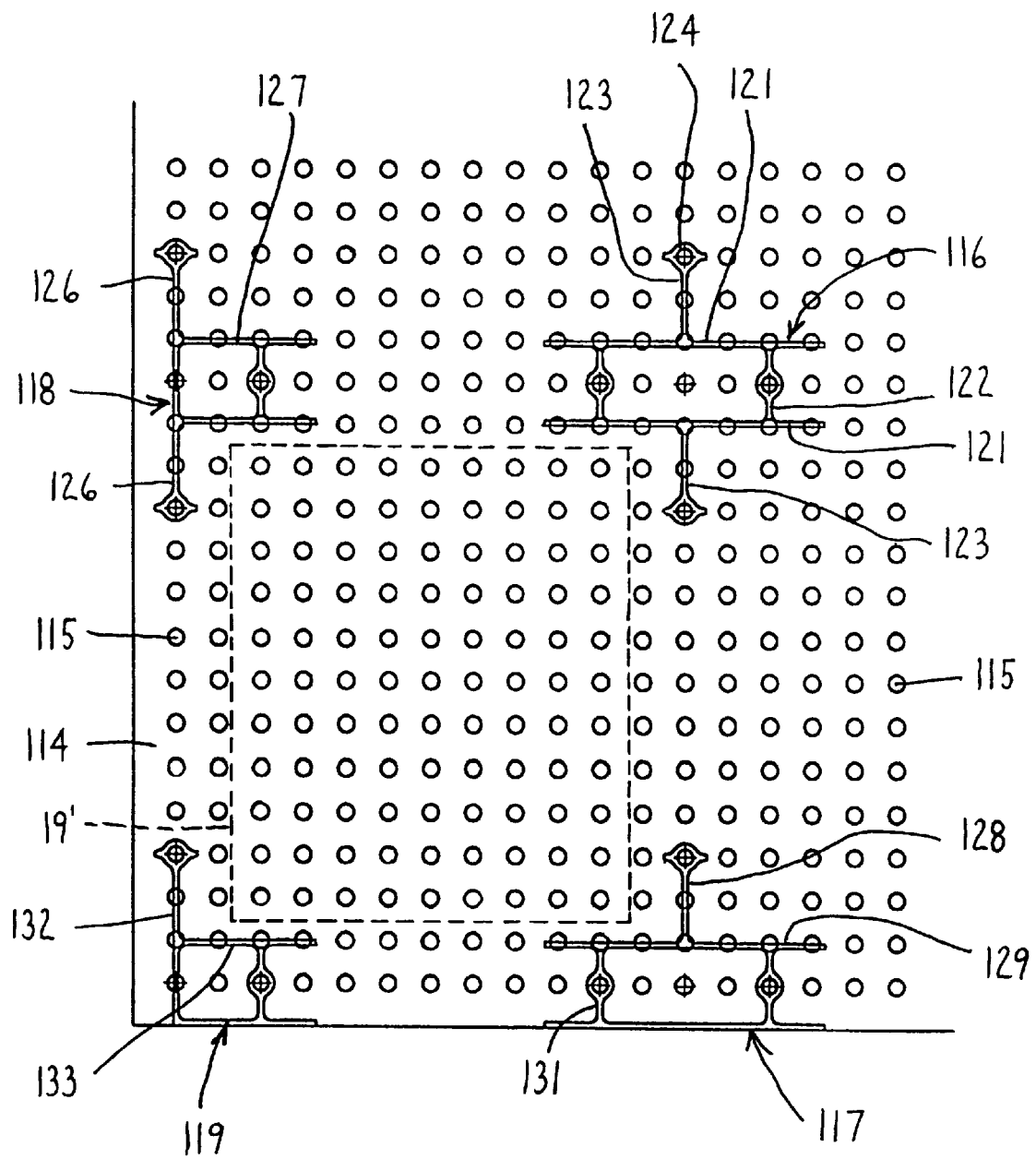
FIG. 16 is an enlargement of a fragment of FIG. 15.
Figure 17:
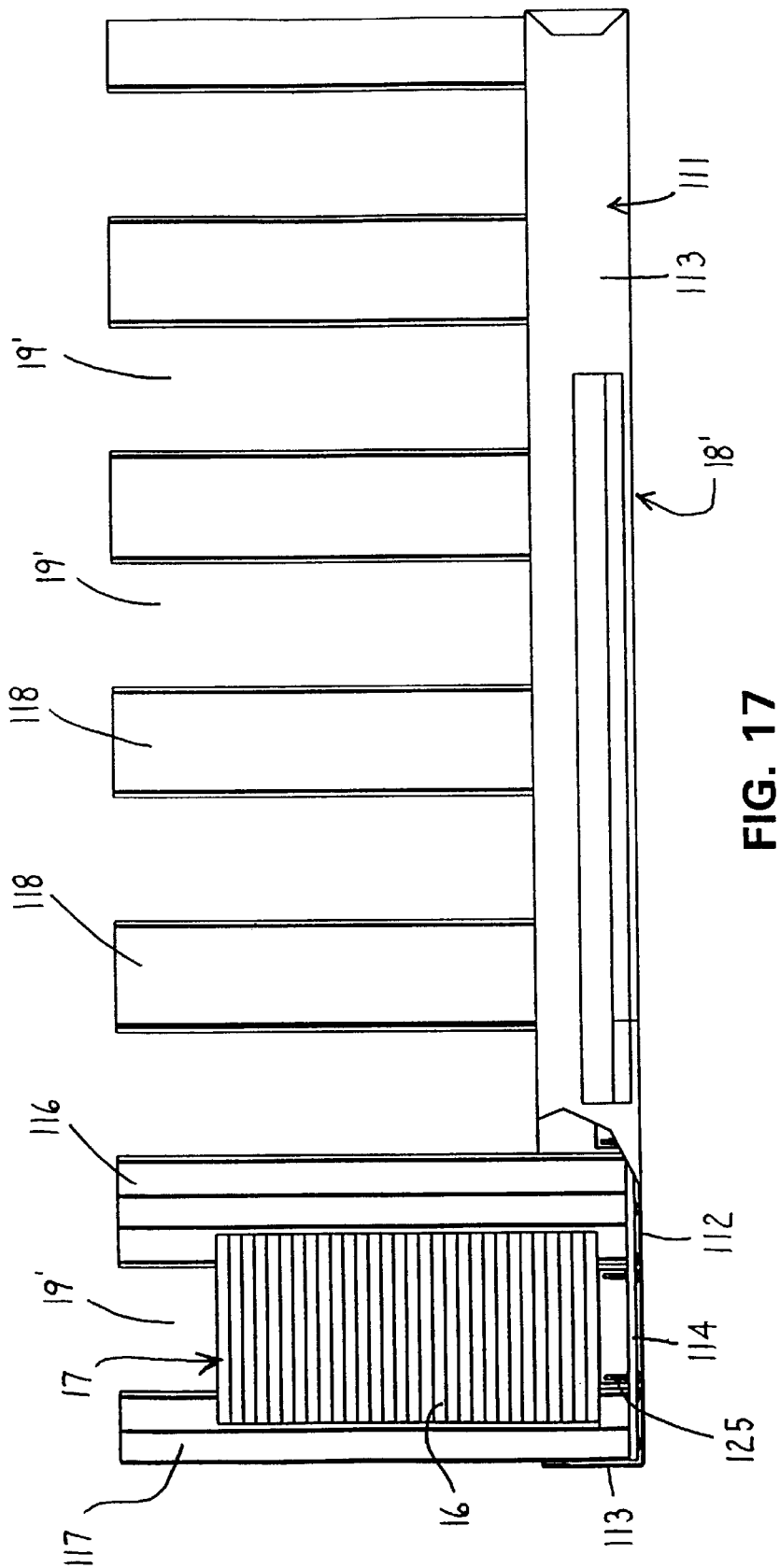
FIG. 17 is a side elevational view of the tote of FIG. 15.
Figure 18:
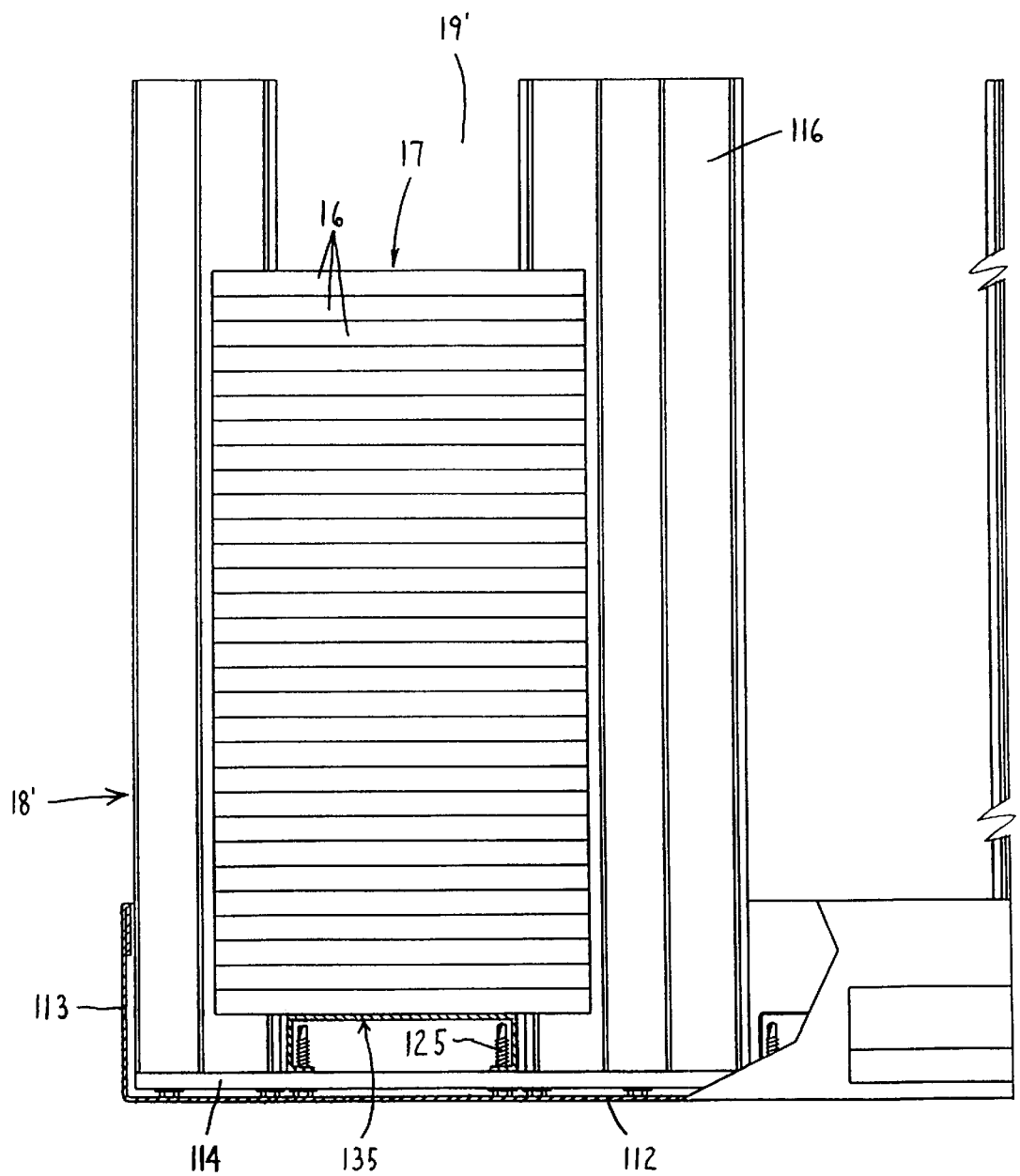
FIG. 18 is an enlarged, fragmentary view of a portion of FIG. 17.

In addition, as illustrated in FIG. 15, all of the dividers are oriented so that the spaced parallel walls extend generally parallel with the elongate orientation of the support channels 135, which parallel walls between adjacent longitudinally aligned dividers define vertically elongated slotlike spaces 136 as disposed adjacent opposite sides of each cell 19'. These latter slotlike spaces 136 permit the gripper side arms 93 of a transfer head 95 to be inserted therein to permit a stack of articles to be inserted into or removed from the cell by means of a transfer mechanism, such as the mechanism 85 described above.

MODIFICATIONS

Figure 21:
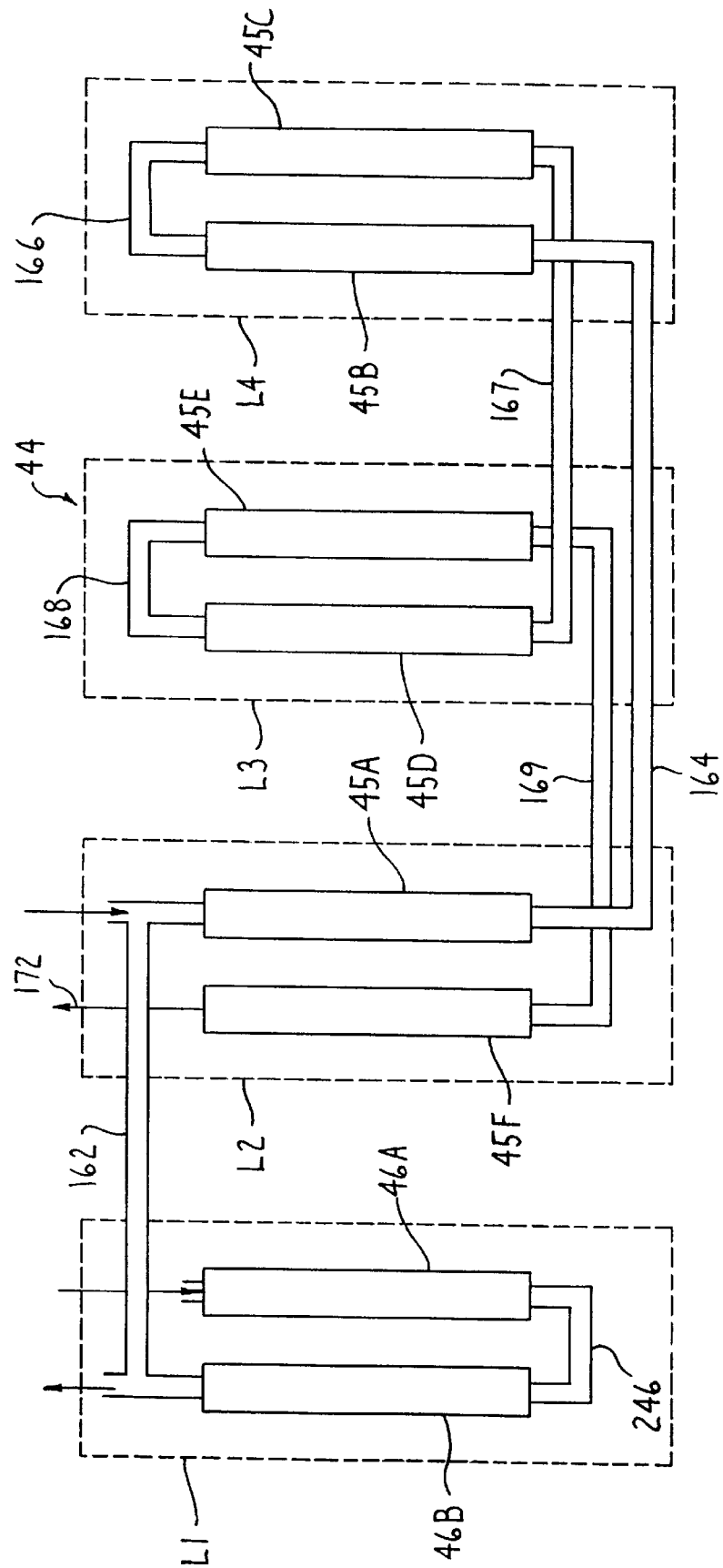
FIG. 21 is a schematic plan view of a first modified system of the present invention.
Figure 22:
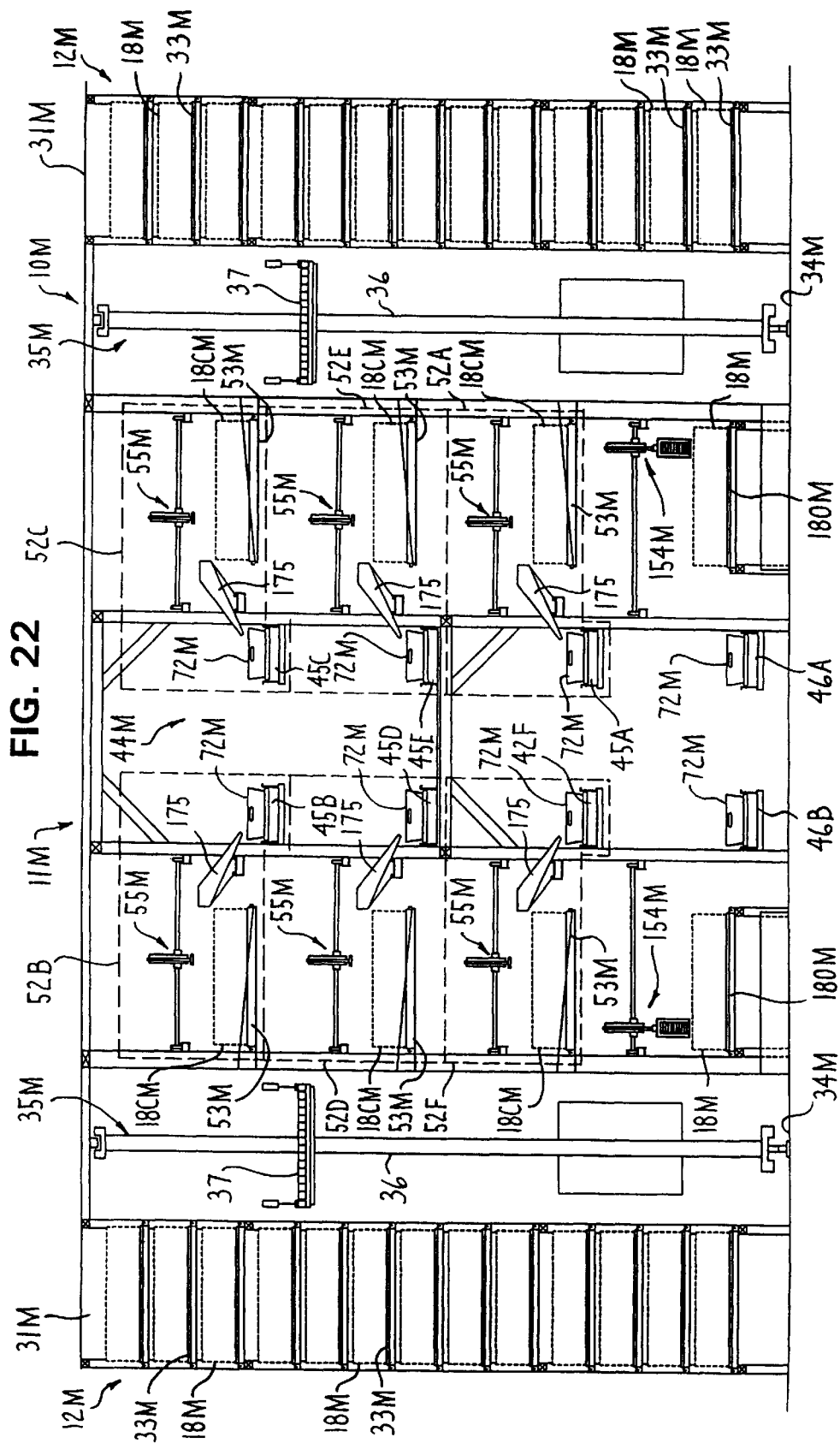
FIG. 22 is a diagrammatic elevational view taken through subzones of the first article pick zone in the modified system of FIG. 21.
Figure 23:
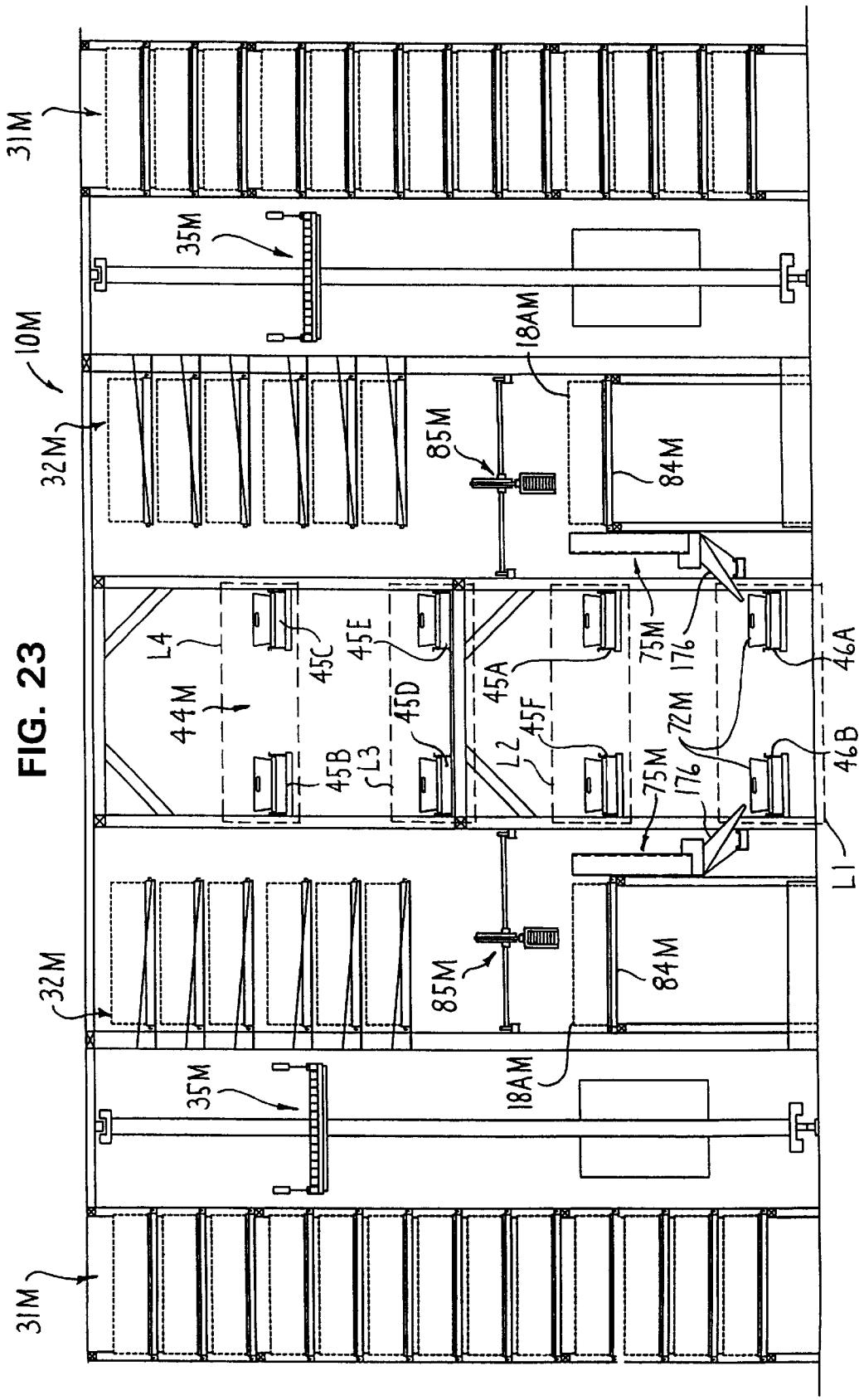
FIG. 23 is a diagrammatic elevational view taken through the second pick zone in the modified system of FIG. 21.

Referring to FIGS. 21–23, there is diagrammatically illustrated a first modified automated storage and retrieval system (ASRS) 10M of the invention. Components of the first modified ASRS 10M are designated with the same reference characters as disclosed above for identical parts, however with a letter "M" appended thereto. The modified ASRS system 10M includes an order pick system 11M and storage arrangement 12M. The modified ASRS 10M is modified from the elongate arrangement of the order pick system 11 discussed above, whereby the modified ASRS 10M vertically stacks the separate picking subzones 52A, 52B, 52C, 52D, 52E and 52F. The modified pick system more compactly and efficiently uses the vertical height in a storage warehouse to either provide an increased number of subzones or more compactly arrange the subzones of the embodiment discussed above.

The modified pick system 11M is positioned between the article storage arrangement 12M. A brief description of the modified article storage arrangement 12M is included below, however, the modified article storage arrangement operates the same as the storage arrangement 12. Vehicles or cranes 35M move storage totes 18M from the storage shelves 33M in the modified storage arrangement 12M into the modified order pick system 11M and travel along aisles 34M located between storage rack 31M and order pick system 11M. The totes 18M moved into the order pick system 11M rest on platforms 53M. Multiple platforms 53M are positioned above one another (FIGS. 22, 23) and the vehicle 35M thus feeds totes 18A onto multiple vertical levels L2, L3, L4 (FIGS. 21, 23) of platforms 53M spaced in a Z direction. There may be multiple platforms 53M on each level longitudinally spaced (in the X direction) adjacent the longitudinal running direction of the conveyor system 44M.

Above each of the platforms 53M, there is a gantry-type article picker 55M which retrieves individual articles from within the cells in the totes 18CM resting on the platforms 53M. The article picker 55M transports a picked article to an intermediate transfer device 175, such as a chute or slide. The chute 175, which is stationarily mounted on the frame adjacent one side of the conveyor, slides the picked article into the appropriate order collection bin 72M being transported on the conveyor system 44M as the bin passes by the lower discharge end of the chute 175. As shown in FIG. 22, the article picker 55M only retrieves articles from one side of the conveyor system 44M unlike the article picker 55 illustrated in FIG. 3. The addition of the chute 175 allows the article picker 55M to be laterally offset from the adjacent segment of the conveyor system 44M and still transport articles from the totes 18CM via the article picker 55M into the bin 72M without the article picker 55M being directly positioned over the conveyor system 44M. However, the article picker 55M could be placed over the adjacent segment of the conveyor system 44M as shown in FIG. 3.

Each of the subzones 52A–52F are defined by a segment of the conveyor system 44M transporting bins 72M therethrough, at least one, and preferably multiple article pickers 55M adjacent the conveyor system 44M, at least one chute 175 associated with each article picker 55M, and a platform 53M supporting multiple article-containing totes 18CM. Two subzones extend longitudinally in and are laterally adjacent one another in each level. As shown in FIGS. 21–23, the second level L2 includes subzones 52A, 52F. The third level L3 includes subzones 52D, 52E. The fourth level L4 includes subzones 52B, 52C. The subzones 52A, 52E and 52C are vertically stacked above each other in the Z direction and cooperate with the storage rack 17M on one side of the system. The subzones 52F, 52D and 52B are vertically stacked above each other in the Z direction and are respectively displaced sidewardly from the subzones 52A, 52E and 52C, and cooperate with the other storage rack 12M disposed on the other side of the system.

The vehicle 35M also supplies totes to support platforms 84M beneath a gantry-type article transfer mechanism 85M (FIG. 23). The transfer mechanism 85M supplies stacks of articles from the totes 18AM on the support platforms 84M into article dispensers 75M. The article dispensers 75M operate the same as the article dispenser 75 discussed above. Different from article dispenser 75 discussed above, the article dispensers 75M dispense individual articles into intermediate chutes 176 which in turn deliver the dispensed articles into order bins 72M. The article dispensers 75M are thusly laterally offset from the adjacent segment 46A, 46B of the conveyor system 44M. In this embodiment, the article dispensers 75M occupy a shorter longitudinal length along the conveyor system 44M than the multiple picking zones 52A–52F occupy to supply the low demand "C" articles. The dispensers 75M dispense the high volume "A" articles into the order-receiving bins 72M.

Like the article pickers 55M in the zones 52A–52F in this modified system, the dispensers 75M individually dispense articles from only one side of the conveyor system 44M. Thus there are two conveyor sections 46A, 46B travelling adjacent opposing dispensers 75M (FIG. 23) moving order-receiving bins 72M thereon. The dispensers 75M dispense articles into the lowest level L1 of the conveyor system. The lowest level L1 contains the conveyor sections 46A, 46B and the order-receiving bins 72M transported by these conveyor sections.

Directly above the lowest level L1, there are positioned second, third, and fourth levels L2, L3, L4. The second level L2 contains sidewardly spaced segments 45A, 45F of the conveyor system 44M and is positioned between lowest level L1 and third level L3. The third level L3 contains sidewardly spaced segments 45D, 45E of the conveyor system. The fourth level L4 is positioned above the third level L3 and contains sidewardly spaced segments 45B, 45C of the conveyor system. The segments 45A, 45E, 45C and 45F, 45D, 45B are positioned directly above one another providing a longitudinally compact serpentine conveyor system 44M.

Referring now to FIG. 21, empty order receiving bins 72M may be inserted into the modified order pick system 11M onto conveyor segment 46A by a bin supply conveying device (not shown). Bins 72M travel the length of conveyor section 46A and receive ordered articles from the adjacent dispensers 75M. A transfer conveyor 246 receives the bins at the end of conveyor segment 46A and shuttles the bins to conveyor segment 46B within the lowest level L1. Dispensers 75A and chutes 176 positioned along one side of conveyor section 46B fill the bins 72M travelling thereon. If the order requires only high frequency "A" articles, the bin 72M leaving the conveyor section 46B can be discharged directly for packaging. However, if the order request low frequency "C" articles, then the bin 72M leaving conveyor section 46B is transferred to a lift conveyor 162 which raises the bin to the second level L2 and transports the bins 72M onto the beginning of conveyor section 45A into order pick subzone 52A. The article picker 55M distributes ordered articles from its zone 52A and drops picked articles into corresponding chute 175. The chutes 175 in turn deposit the picked articles into the appropriate order receiving bin 72M travelling on conveyor segment 45A. After leaving subzone 52A, conveyor segment 45A deposits the bins 72M onto a lift conveyor 164 for transport up to the fourth level L4 (FIG. 21).

Conveyor segment 45B receives the bins 72M from lift conveyor 164 and transports the bins through subzone 52B. The article picker 55M in zone 52B picks articles, as discussed above, and deposits them in the chute 175 intermediate the article picker 55M and bin 72M. The chute 175 in turn deposits the picked articles into the appropriate order receiving bin 72M. Conveyor segment 45B deposits the totes onto a transfer conveyor 166. The transfer conveyor 166 transports the bins from subzone 52B to subzone 52C and deposits the bins on conveyor segment 45C within the fourth level L4. Conveyor segment 45C transports bins 72M through subzone 52C. The article picker 55M and chute 175 in subzone 52C deposit order articles into the bins 72M. After a bin 72M completes its travel through subzone 52C, then conveyor segment 45C deposits bins 72M onto a decline conveyor 167. Decline conveyor 167 transports bins 72M downward to level L3 onto the beginning of conveyor segment 45D (FIG. 21). Conveyor segment 45D transports bins 72M through subzone 52D. Article picker 55M and chute 175 operate in a same manner as in the other subzones to deposit ordered articles into bins 72M travelling on conveyor segment 45D in subzone 52D.

Conveyor segment 45D deposits bins 72M onto a transfer conveyor 168 after travelling through subzone 52D. Transfer conveyor 168 transports the bins from the end of conveyor segment 45D to the beginning of conveyor segment 45E still within the third level L3. Conveyor segment 45E transports the bins 72M through subzone 52E, wherein ordered articles are deposited into bins 72M in the same manner as in the other subzones operate, and then the conveyor segment 45E deposits the bins onto a decline conveyor 169. The decline conveyor 169 downwardly transports the bins 72M from an end of conveyor segment 45E and deposits the bins onto the beginning of conveyor segment 45F. The conveyor section 45F transports the bins 72M through subzone 52F which operates in a similar manner to subzone 52B to deposit ordered articles into bins 72M. After travelling through subzone 52F, the bins 72M are filled with low selection frequency articles, and conveyor segment 45F deposits the filled bins onto an exit conveyor illustrated by arrow 172 (FIG. 21).

The above description discloses bins 72M first entering the high frequency of selection or A type articles dispenser zones which include dispensers 75A, but it is also possible to enter empty bins directly onto conveyor section 45A if the order corresponding to that bin 72M does not contain any A-type high frequency of selection articles. Thus, the tote will not need to travel through the lower level L1 containing the conveyor sections 46A, 46B when it does not contain any ordered articles of the high frequency selection, "A" type.

The dispensers 75M do not extend along the entire longitudinal length (X dimension) of the conveyor system 44M and thus the second level L2 subzones 52A, 52F may be blocked in the area of the dispensers 75M. Alternately, the dispensers 75M may be disposed so as to extend longitudinally inwardly from one end of the system 10M through only a limited longitudinal extent thereof, with the subzones 52A through 52F as associated with levels L2 through L4 extending throughout the remainder of the longitudinal length of the system 10M, with the region of level L1 beneath the subzones being occupied by stack transfer structures defined by transfer mechanisms 154M and totes 180M as illustrated in FIG. 22 and as described hereinafter. In the longitudinal extent of the system occupied by the dispensers 75M, the regions directly above the dispensers can be provided with additional storage racks 32M (FIG. 23) for storage of additional totes thereon, which totes are on the opposite sides of the aisles from the storage racks 31M and are accessible by the tote transfer vehicle 35M.

Adjacent the lowest level L1 and after the end of the dispensers 75M, three-dimensional transfer mechanisms 154M (FIG. 22) are positioned and extend longitudinally beneath the subzones 52A and 52F. The transfer mechanisms 154M are identical in structure to transfer mechanisms 154 and 85 described above. However, transfer mechanism 154M relocates stacks of articles from within adjacent totes 18M. Vehicles 35 transport totes 18M onto a tote-supporting platform 180M. The platform 180M supports totes 18M beneath transfer mechanism 154M which in turn relocates stacks of articles between totes 18M accessible by transfer mechanism 154M. The rearranged and filled totes 18M can then be used as replacements for the totes 18CM. Transfer mechanisms 154M are positioned directly beneath the second level subzones 52A, 52F.

Referring to FIGS. 24–27, there is diagrammatically illustrated a second modified automated storage and retrieval system (ASRS) 210. The elements of this modified ASRS 210 uses the same reference characters used above to designate corresponding parts, except that the reference characters are preceded by a "2".

Figure 24:
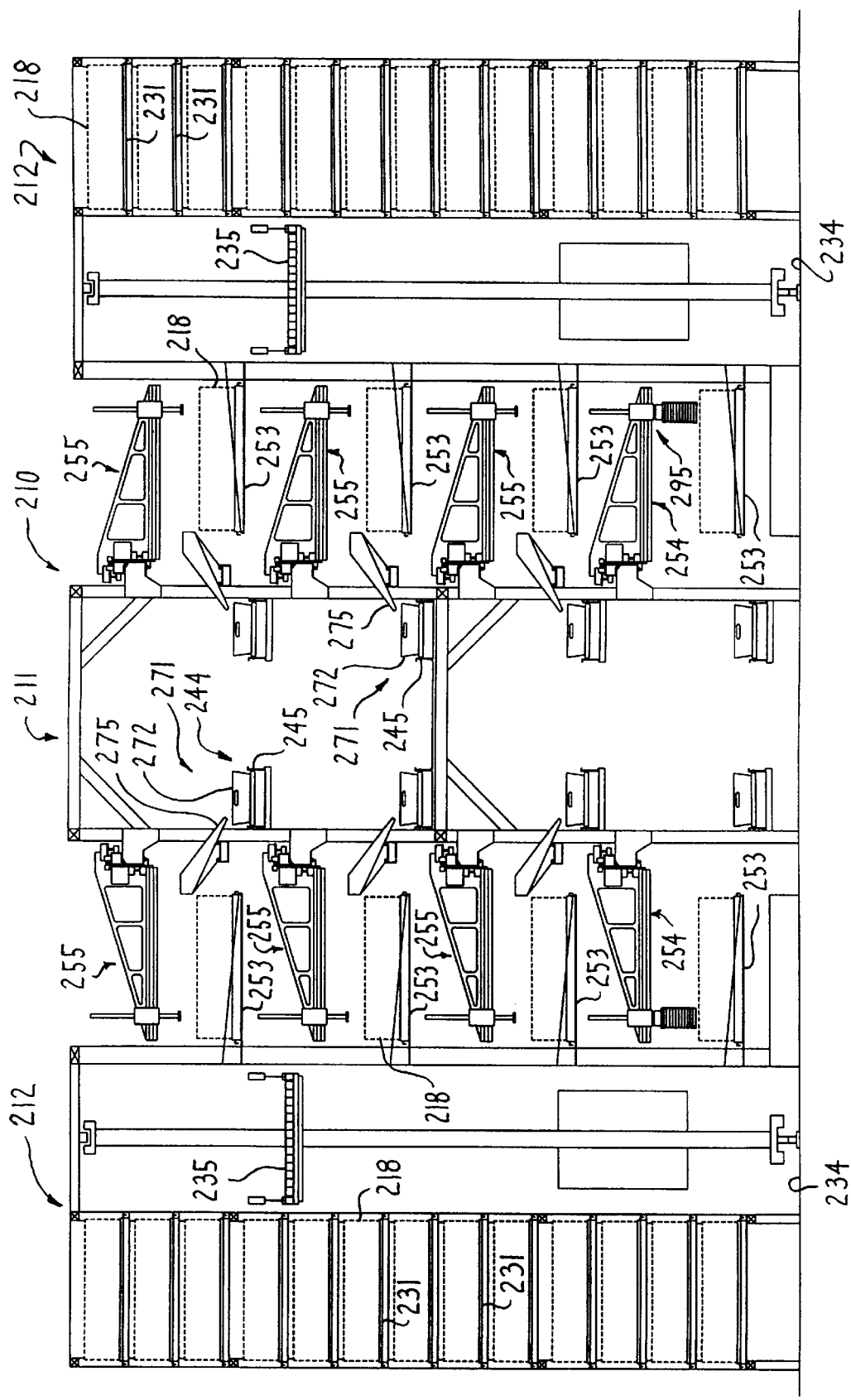
FIGS. 24 and 25 are diagrammatic elevational views which respectively correspond to FIGS. 22 and 23 but which illustrate a second modified system of this invention.
Figure 25:
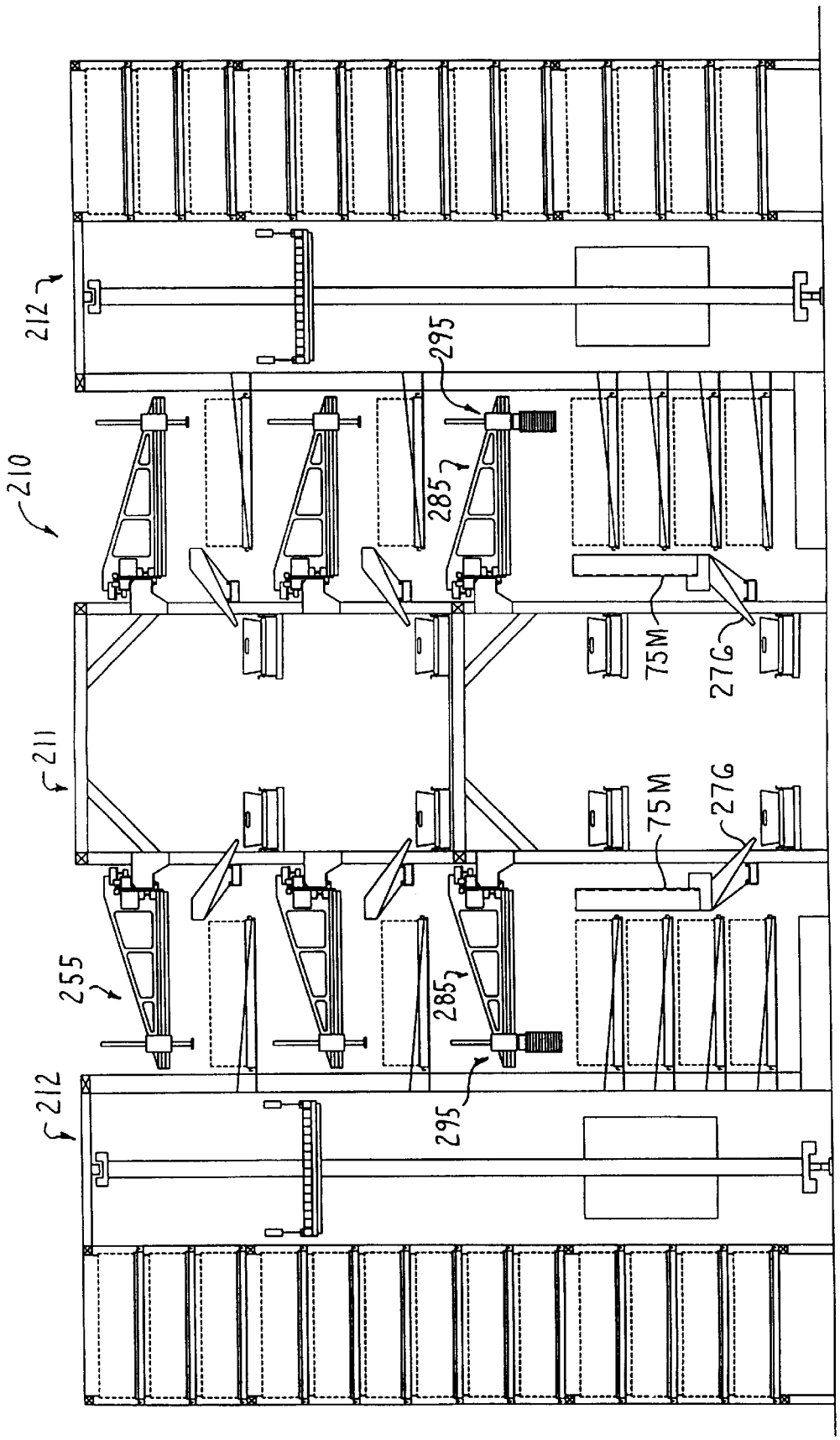

The modified ASRS system 210 includes an order pick system 211 and storage arrangement 212. The storage arrangement 212 is similar in structure and function to the article storage arrangement 12M of the ASRS 10M as discussed above. Vehicles or cranes 235 move storage totes 218 from storage shelves 233 in the storage arrangement 212 into the order pick system 211. The order pick system 211 has multiple cantilevered platforms 253 positioned above one another (FIGS. 24, 25) in vertically spaced relation, and the vehicle 235 delivers totes 218 onto the different levels of platforms 253 spaced in a Z (i.e. vertical) direction. In the illustrated embodiment, each level has two sidewardly spaced platforms which are horizontally elongated in an X direction and are disposed sidewardly, adjacent the longitudinal running direction of the conveyor system 244. The conveyor system 244 may have the stacked serpentine arrangement shown in FIGS. 21–23. As shown in FIGS. 24–25, the order pick system 211 has the first order pick zone defined by three vertically spaced levels providing the serpentine multilevel picking subzones as discussed above, for dispensing the low frequency (i.e. "C") articles, and one lowest level defining the second picking zone corresponding to dispensers 275 for dispensing the high frequency articles, i.e, the "A" type articles.

Figure 26:
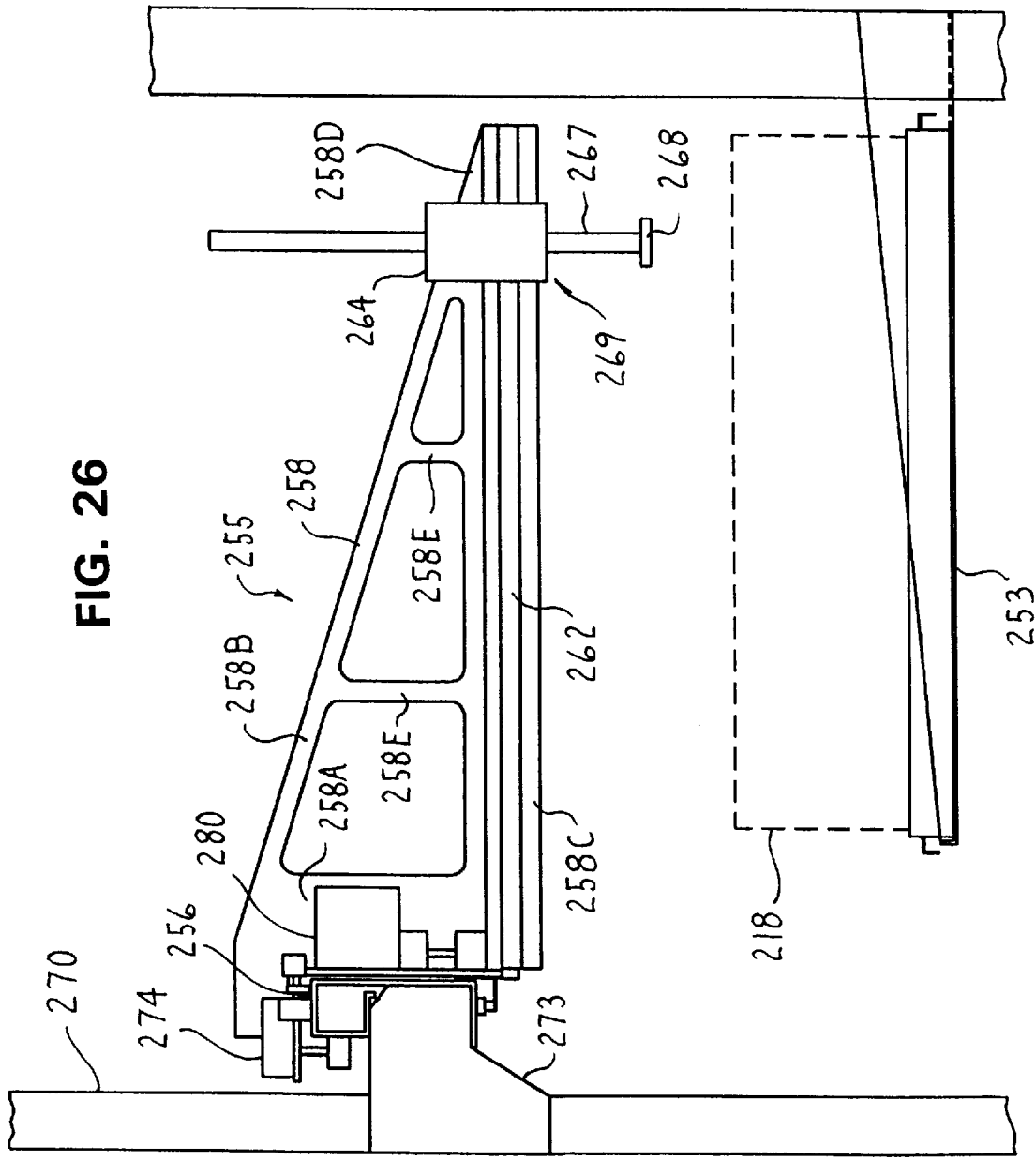
FIG. 26 is an enlarged elevational view of the transfer mechanism for the modified system of FIGS. 24–25.
Figure 27:
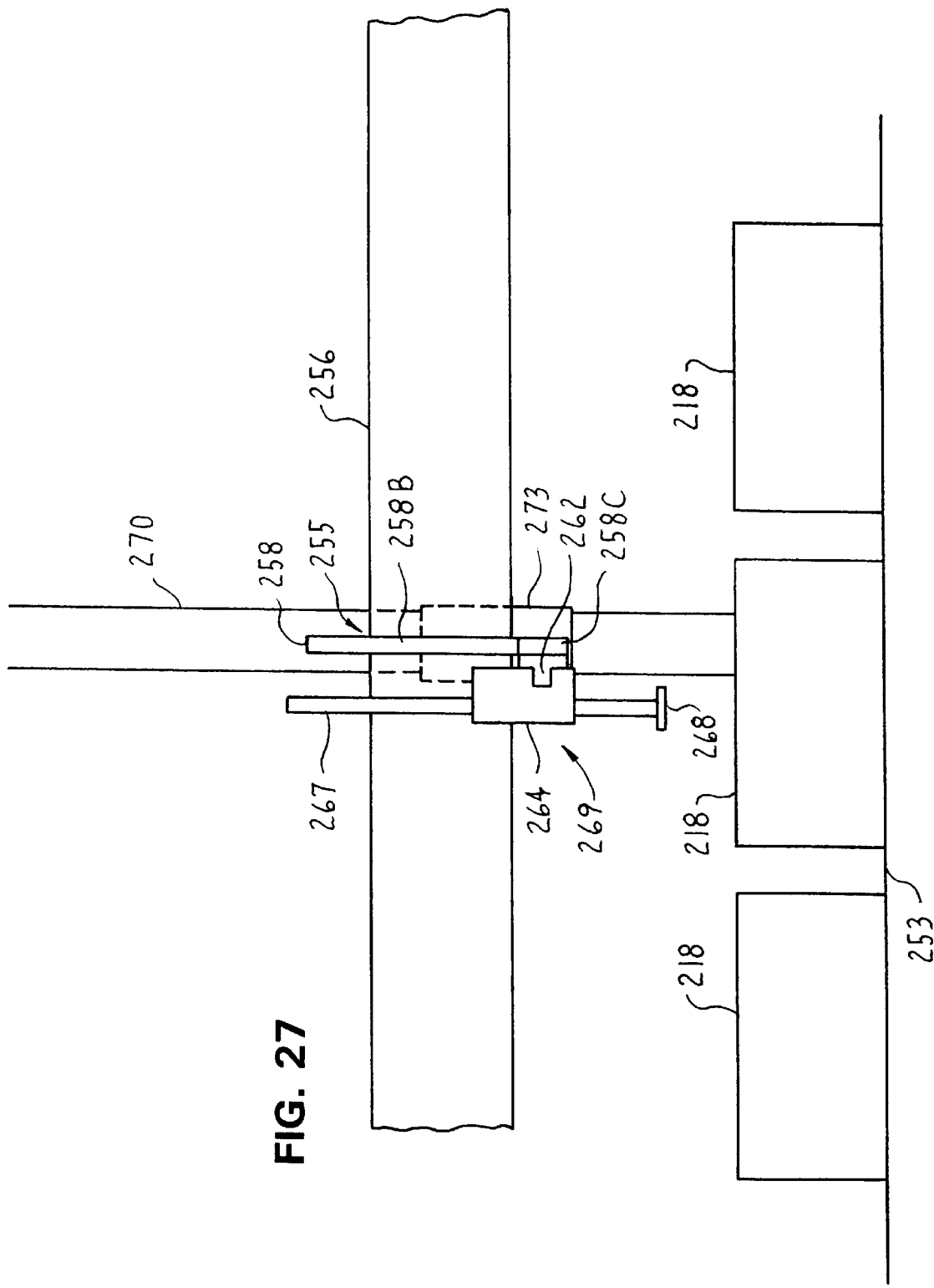
FIG. 27 is a simplified end view of the transfer mechanism of FIG. 26.

Above each of the levels of the platforms 253, there is provided a modified article picking mechanism 255. The modified article picking mechanism 255 is a cantilevered gantry so as to require support along only one side of the platforms 253, such as provided by a support rail 256. Thus, the need to coordinate movement of the picker at both ends is removed. Further, a movable support connecting the picker to a second rail is not required. In operation, the cantilevered picker 255 performs the same function as the mechanisms 55, 55M described hereinabove. That is, the cantilevered article picker 255 is capable of picking an individual article from any of the compartments contained in any of the totes 218 within the respective pick face of the subzone defined by the totes supported on the respective platform 253. As shown in FIGS. 26–27, the cantilevered picker 255 has a generally triangularly-shaped frame 258 having a horizontally extending slide rail 262 along a lower horizontally-extending thereof. The frame 258 is generally of greatest height on its side 258A (FIG. 26) where it is supported on the rail 256. The other two sides 258B, 258C of the frame extend from the side 258A and terminate at the free end 258D. Vertical braces 258E extend between the two sides 258B, 258C.

The frame 258 at its side 258A is movably connected to the support rail 256 in a conventional manner. Multiple rails 256 are secured to vertically extending support posts 270 by securement piece 273. Each rail 256 is vertically separate from adjacent rails for individually supporting cantilevered pickers 255 in vertically stacked picking subzones. Each rail 256 extends horizontally, longitudinally and generally parallel to the longitudinal direction of the adjacent conveyor 245.

An actuator 274 (FIG. 26) is secured to either the cantilevered picker 255 or to the rail 256 and provides motive power for linearly positioning the cantilevered picker 255 along the longitudinal length of the rail 256. The actuator 274 is controlled by a central controller. The actuator 274 may be a motor driving a gear directly engaging the rail 256, a motor driving the cantilevered picker 255 utilizing drive belts, or other conventional drive means for moving and positioning the picker 255 along the respective rail 256 in the X-direction. As shown in FIGS. 26 and 27, the actuator 274 is mounted on the side 258A of the frame 258 closely adjacent and above the rail 256. The positioning of the actuator 274 lessens the stress on the frame 258 and junction of the frame and rail 256.

A second actuator 280 is provided on the frame 258 for providing motive force for a carriage 264 sliding on the slide rail 262 to position the carriage 264 in the Y-direction longitudinally along the cantilevered picker 255 (generally transverse to the travelling direction of the conveyor section 245) over a compartment in the tote 218 containing the next article to be retrieved. The second actuator 280 is controlled by the central controller. The second actuator 280 is also preferably positioned closely adjacent the respective rail 256 for reducing the stress created by the weight of the second actuator 280 on the junction of the frame 258 and rail 256.

The carriage 264 moves on the slide rail 262 in the Y-direction generally perpendicular to the longitudinal direction of the conveyor 245 defining the X-direction. The carriage 264 moves outwardly to retrieve an article from a selected tote compartment, then it moves inwardly to deposit the selected article in an order receiving area 271, shown in FIGS. 24–25 as a slide 275 and bin 272. The bin 272 is carried by the conveyor section 245 past the slide 275. The slide 275 releases the picked article into the bin 272.

The carriage 264 includes a further actuator for controlling vertical movement of an elongate rod 267. The rod 267 is mounted to move in a substantially vertical Z-direction relative to the slide rail 262 and its movement is directed by the central controller. A pickup element 268 is mounted at the lower end of rod 267 for selectively gripping a selected article. The rod 267 and pickup element 268 define a pickup head 269 for gripping a selected individual article and lifting it from a cell in the tote 218. The pickup element 268 is preferably an air-operated device for gripping articles by suction. The suction may be provided through a conventional hose (not shown) from a conventional vacuum arrangement (not shown). The carriage 264 and pickup head 269 can be constructed similar to the corresponding parts of the picker mechanism 55 described above.

It is further foreseen that the cantilevered picking mechanism 255 may be adapted to pick articles when moving in a rotary manner. For example, the fixed end of the cantilevered picking mechanism may define a vertical pivot axis so that the free end of he cantilevered picking mechanism moves in an arcuate path. The first linear actuators must be replaced by a rotary drive device to provide motive force for pivoting the cantilevered picking mechanism.

The ASRS 210 may also include transfer mechanisms 254 (FIG. 24) for transferring stacks of articles between totes 218 placed upon the same level 253, the lowest level 253 in FIG. 24. The transfer mechanisms 254 are identical to the cantilevered pickers 255 described above except that the pickup head 269 is replaced by a transfer head 295 which is movable horizontally longitudinally, horizontally transversely and vertically (i.e., movable in X-Y-Z directions) to effect transfer of a stack of articles from a selected cell of one tote to a selected cell of another tote. Transfer mechanisms 254 are controlled by a central controller which determines which specific types of articles are placed in each cell of each tote. The transfer mechanisms 254 are cantilevered the same as described above with regards to the cantilevered pickers 255.

The high demand article dispensers 75M (FIG. 25) are replenished with high demand articles, i.e. the A-type, via an automated replenishment system having a cantilevered article transfer mechanism 285. The cantilevered article transfer mechanism 285 has a structure similar to that described above with regards to the cantilevered replenishment gantry 254. However, it operates the same as the gantry-type article transfer mechanism 85. The cantilevered article transfer mechanism 285 is controlled by the central controller and is adapted to move a transfer head 295 over a specific cell in the appropriate tote containing the high demand article. The entire stack of high demand articles is gripped by the transfer head 295 and removed from the cell in the tote. The cantilevered replenishment mechanism 285 moves its transfer head 295 gripping the article stack over the selected dispenser 75M. The transfer head 295 lowers the gripped stack into an article receiving slot in the selected dispenser 75M.

The modification of FIGS. 24–47 operates in generally the same manner as the modification of FIGS. 21–23 as described above so that further detailed description thereof is believed unnecessary.

In the latter modifications, the transfer device 175, 176, 275, 276 can be provided with an openable gate; if necessary or desired, controlled by the central computer so as to properly synchronize discharge of the article therefrom to the selected area or bin on the moving conveyor section.

OPERATION

The operation of the storage and retrieval system of the present invention will now be briefly described to ensure a more complete understanding thereof. The following description will relate solely to FIGS. 1–20 for convenience in description.

In operation of the system 10, it is contemplated that the order picking function of the system will occur in work shifts, such as during a conventional eight-hour work shift. During this order-picking shift, the totes 18C provided at the pick interface of each of the subzones within zone C will contain sufficient quantities of the required "C" type articles to permit continuous order picking throughout the shift. As to the order picking in the A and A/B zones, it is again contemplated that the initial filling of the compartments within the dispensers, as well as the additional stacks of articles contained in the replenishment totes 18A and 18A/B, will be adequate to permit order picking throughout the entire order pick shift.

During the carrying out of one order pick shift, the totes are prepared in contemplation of the demands of the next order pick shift. In this regard, and as diagrammatically illustrated in FIG. 20, the orders for the next shift are inputted into the controller (i.e., the computer) and the articles making up the collection of orders for the next shift are evaluated to determine not only the different articles required for picking during the next shift, but also the number of each different article. The controller thus determines which articles will be placed into each cell of each order pick tote and where each order pick tote will be positioned in each sub zone in order to evenly distribute the order demand across all of the picking and transporting resources and thereby maintain a continuous and orderly throughput. The controller (i.e., the computer) includes a knowledge based inference engine which over time acquires knowledge of order trends and patterns; as well as machine performance, and uses this data to facilitate and direct specific devices in a manner that maintains equipment capacity and overall system design performance. During this time (i.e., during the time when the current pick shift is being carried out), the totes for the next pick shift are thus prepared. For example, the totes can be returned from the storage racks 31 and 32 by the vehicles 35 to the tote replenishment station 14 (FIG. 14), and by proper supplying of totes to the conveyors 142 and 143 and the transfer of stacks between the totes, pick totes for zone C or replenishment totes for zones A or A/B can be created according to the anticipated needs of the next shift, which totes are thereafter returned to preassigned storage spaces in the racks 31 and 32. During this same time additional articles are fed into the system by being transferred from the loading station 149 to storage totes which are then transferred and stored in assigned spaces within the racks 31 and 32.

Following completion of the ongoing order pick shift, the computer evaluates the totes which remain either in the pick zone replenishment positions or at the order pick interfaces to determine which ones need to be replaced either with new totes or with totes containing different articles. These totes will be returned by the storage/retrieval vehicles 35 to the racks 31 and 32, and the vehicles 35 in turn will withdraw the prepared totes from the storage rack and appropriately position them either at the order pick interface of zone C, or in the replenishment positions of zones A or A/B.

In situations where the "C" articles in each subzone C1, etc. are being picked from the pick face and deposited directly on the conveyor belt by the pick head, then in such instance the totes 18C which are associated with the platforms 53 and which define the pick face for the respective subzone are preferably oriented so that the totes 18C containing the "C" articles of highest demand in the subzone are disposed adjacent the input (i.e. upstream) end of the subzone, with the totes 18C being oriented longitudinally in a downstream direction so that the totes 18C containing the "C" articles of least frequency of demand are disposed at the downstream end of the subzone. This thus facilitates the movement of the pick and transfer mechanism 55 with respect to its ability to pick-up the desired individual articles from the pick face and thereafter deposit the individual articles on the preassigned order-receiving space 71 of the respective moving conveyor belt section.

On the other hand, if the pick and transfer mechanism 55 does not deposit the articles directly on the belt (for example, the High Speed Picking System disclosed in a patent application filed May 9, 1997 naming R. Lichiti as the inventor), but instead deposits the articles on an intermediate storage platform located adjacent the belt, then in such case the distribution of the order-pick totes 18C longitudinally along the conveyor belt are more uniformly positioned with respect to the frequency of demand of the articles contained therein.

After all of the order pick totes and replenishment totes have been supplied by the vehicles 35 to the desired locations associated with the pick zones, the next order pick shift can be initiated.

At the time of initiating the order pick shift, the orders which include "C" articles are always assigned an order-receiving space 71 on the conveyor system at the input end of zone C, which space 71 may be defined directly on the belt or if desired the belt can be provided with an order collecting bin 72 at the preassigned space. In this latter situation the empty bins 72 are returned to the input end of zone C by the return conveyor 158. On the other hand, if the bins 72 are not used in the order pick zone C, then they are preferably provided to the conveyor at the input end of pick zone A and for this purpose the bins can be supplied to the beginning of pick zone A by the return conveyor 159.

To permit sequential filling of the individual orders, the conveyor system moves continuously through the pick zones and the central controller controls the movement of the article picker 55 associated with each of the C subzones so that the respective article picker is capable of picking one or more articles from the respective pick interface defined by the totes 18C and then sequentially deposits the picked articles into the assigned order space 71 or bin 72 on the conveyor belt. This sequence occurs as the belt progressively moves the order space 71 or bin 72 successively through the different subzones of zone C, with the operations of all of the article pickers 55 of the subzones being controlled by the central controller. The central controller also maintains an inventory of all of the articles which remain in each cell of each tote as positioned at the pick face.

After leaving zone C, the preassigned order spaces, some or all of which may contain "C" type articles, then move through pick zone A and the central controller again controls dispensing of individual articles from the various dispensers 75 so as to permit the ordered "A" articles to be dispensed into the appropriate order collecting bin 72 as the latter passes under the respective dispenser. Since the demand for the "A" articles within any of the dispensers 75 may exceed the storage capacity thereof during the length of the order pick shift, the controller will recognize when replenishment of the dispenser chamber with articles is desired, and hence will initiate movement of the transfer mechanism 85 so as to effect removal of a stack of articles from one of the replenishment totes 18A and will then move the transfer mechanism 85 as necessary so as to permit insertion of the stack into the appropriate dispenser 75. This operation will be carried out as necessary with respect to the various articles and dispensers so as to permit optimum and automated dispensing of the high-frequency selection "A" articles into the preassigned order collecting bins 72 as the latter move through the pick zone A.

Upon leaving the pick zone A, the computer diverts those orders which have been already fully filled onto the by-pass conveyor 51 so as to supply them directly to the packaging station for packaging and shipment.

On the other hand, those orders departing zone A which are only partially filled are sent by the computer directly to zone A/B. During passage through this latter zone, any additional ordered articles, either A and/or B type, are dispensed from the compartments of the A frame dispenser under control of the computer so that the dispensed articles are deposited into the preassigned order-receiving bins 72 so as to complete the order. The completed order exiting the zone A/B is then forwarded directly to the packaging station for packaging and shipment.

Since the chambers associated with the A frame dispensers of zone A/B will normally not contain sufficient articles to permit performance of the complete order pick shift, particularly the "A" articles, the computer maintains a running control over the quantity of articles in each chamber of each A frame and, when additional articles are needed, the computer activates the transfer mechanisms 107 associated with zone A/B so as to permit transfer of selected stacks of articles from the replenishment totes 18A/B into the chambers of the A frame dispensers.

With respect to orders which do not include any low selection frequency articles, i.e., no "C" articles, but which do contain "B" articles, such orders can be handled directly by pick zone A/B. In this situation the computer defines an order collecting space 71 on the conveyor directly at the input end of zone A/B, such spaces being available inasmuch as some of the orders have already been transferred unto bypass conveyor 51. The new order space which is assigned at the input end of zone A/B is then moved through zone A/B and only the ordered A and/or B articles are appropriately dispensed into this space so as to permit filling of the order.

With respect to orders which contain only high selection frequency articles, namely "A" articles, these orders can be inputted either into the input of zone C, or into the input end of zone A/B, such being automatically selected by the computer so as to appropriately balance the number of orders which are being supplied to the different pick zones of the conveyor system.

Figure 19:
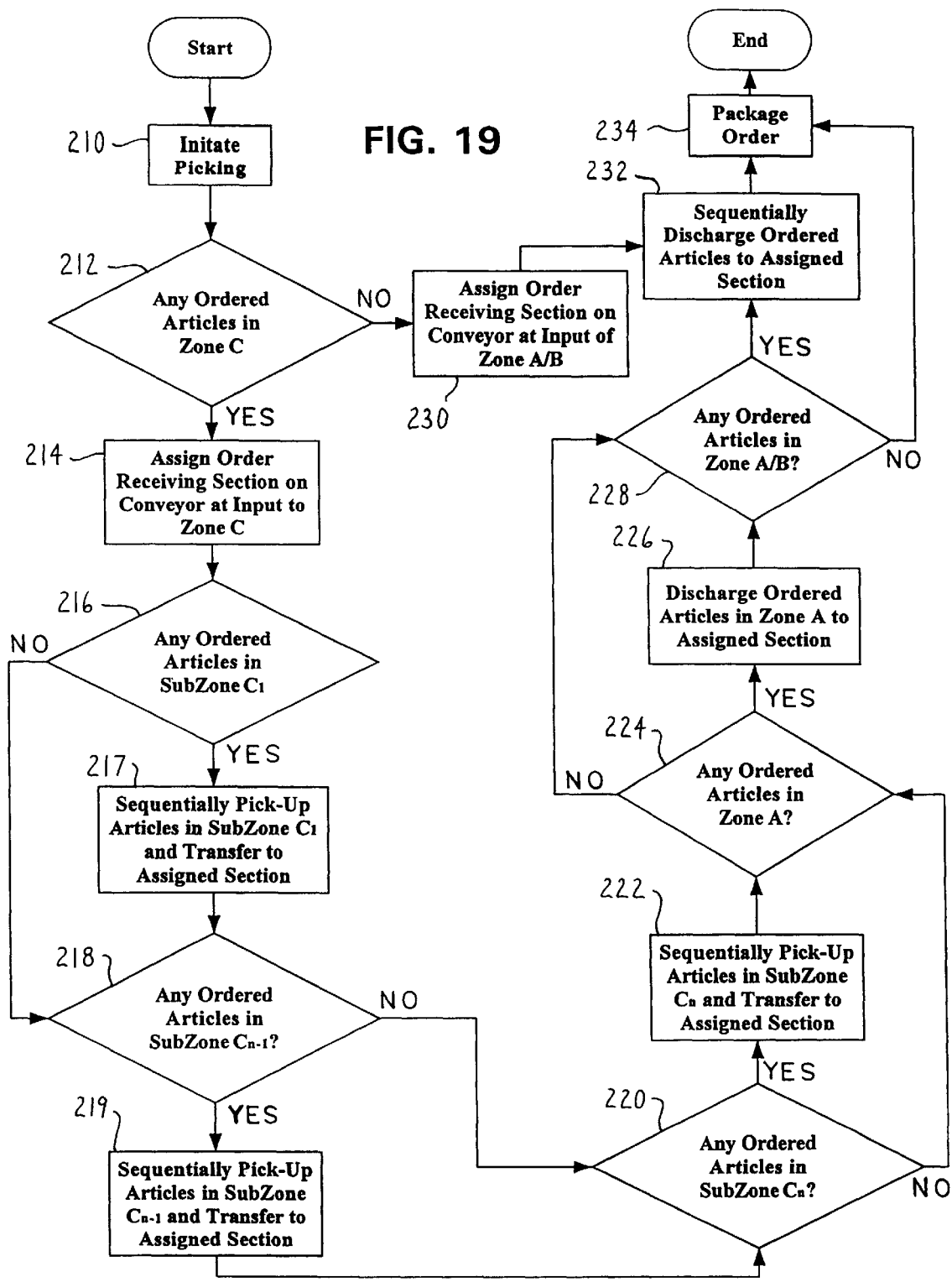
FIG. 19 is a flow chart which illustrates the order picking sequence according to the system of the present invention.
Figure 20A:
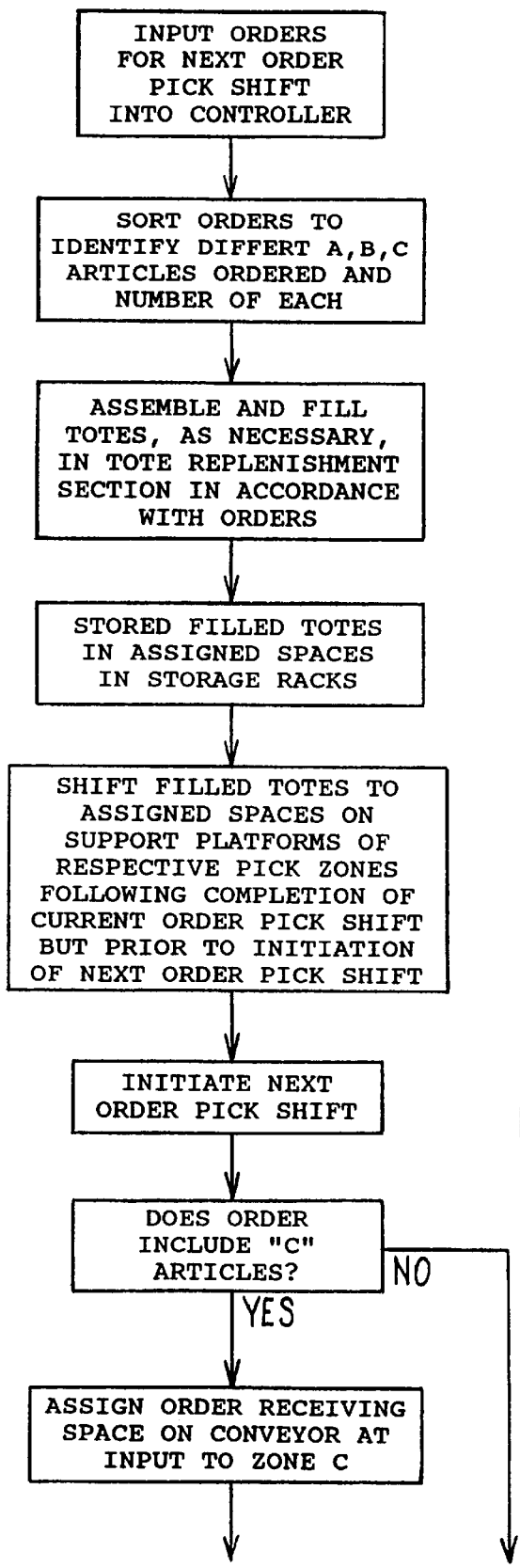
FIG. 20 (and parts FIGS. 20A and 20B) is a further flow chart for explaining the operation of the system of this invention.
Figure 20B:
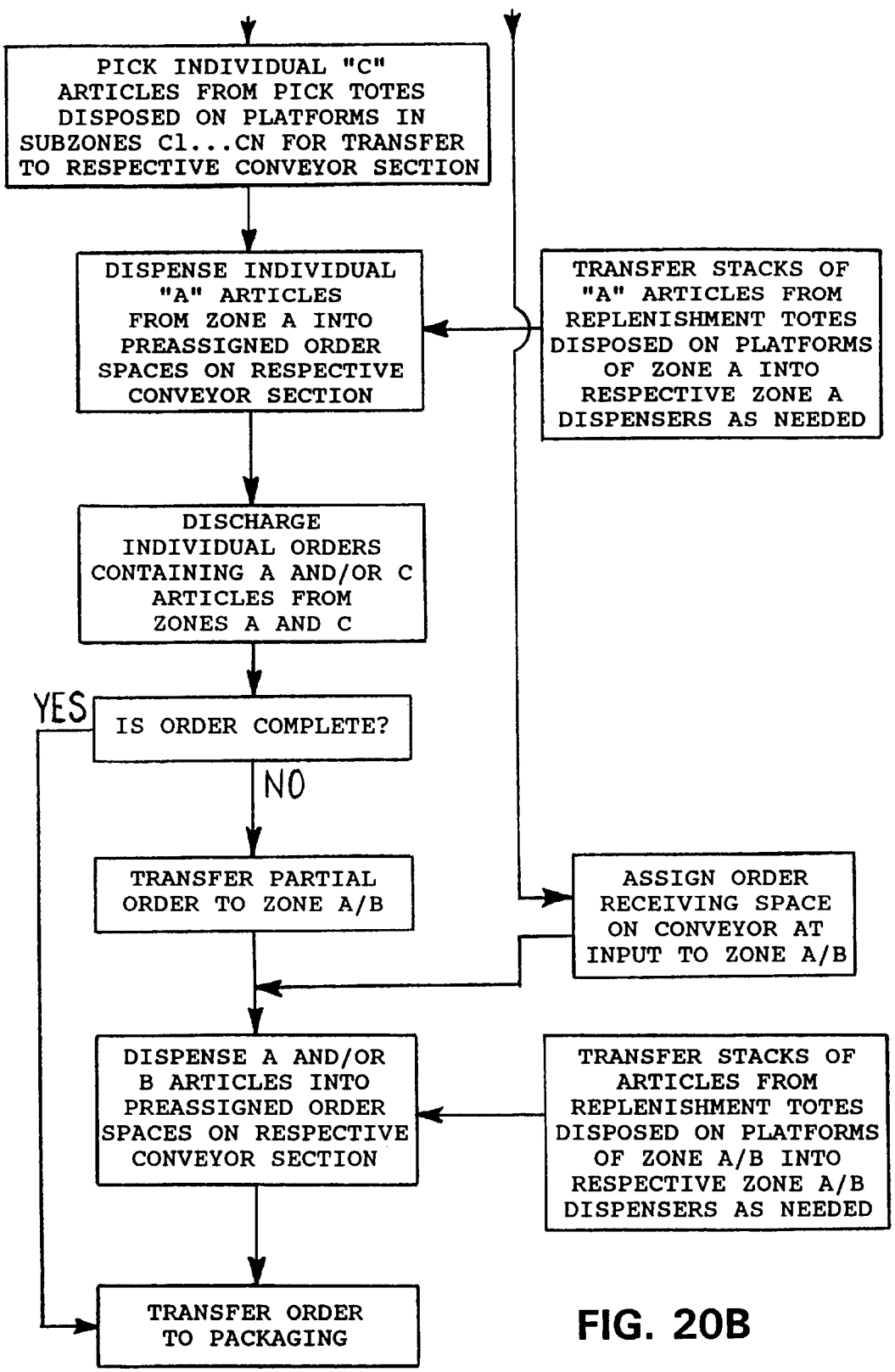

Referring now to FIG. 19, there is illustrated steps for filling orders in an order filling operation. A central controller (i.e. computer) begins a picking operation (step 210) for an order and then decides whether any articles in a specific order require low frequency of selection "C" articles (step 212). If the controller yields a yes result in step 212, then the controller assigns an order receiving section on the conveyor at an input to zone C (step 214). A no result in step 212 causes the controller to skip to step 230 discussed below.

The controller next decides whether any articles for a specific order are contained in any of the subzones $C_1 \ldots C_{n-1}$, $C_n$. The number of subzones $C_n$ is variable and depends upon the hardware available to define each subzone $C_n$. In step 216, the controller decides if an ordered article is in subzone $C_1$. If step 216 yields a yes result, then the controller operates the corresponding article picker 55 and transfers the picked article to the section of a conveyor assigned to the specific order (step 217). The section of the conveyor could include a bin positioned on the conveyor for receiving ordered articles therein. After completion of step 217, the controller proceeds to step 218. If step 216 yields a no result, the controller skips to step 218. In step 218, the controller decides if an ordered article is in the next subzone, shown as subzone $C_{n-1}$. If step 218 yields a yes result, then the controller proceeds to step 219. In step 219, the controller operates the article picker 55 corresponding to subzone $C_{n-1}$ and transfers the picked article to the section assigned to the order. After completion of step 219, the controller proceeds to step 220. If step 218 yields a no result the controller skips to step 220. In step 220, the controller decides if any ordered articles are in subzone $C_n$. If step 220 yields a yes result, the controller proceeds to step 222. In step 222, the controller operates the article picker 55 corresponding to subzone $C_n$ and transfers picked articles to the assigned section of the conveyor. After completion of step 222, the controller proceeds to step 224. If step 220 yields a no result, then the controller skips to step 224.

In step 224, the controller decides whether the specific order includes any high frequency of selection "A" type articles. If step 224 yields a yes result, then the controller proceeds to step 226 and operates dispensers 75 to discharge ordered articles to the assigned section of the conveyor. After completion of step 226, the controller proceeds to step 228. If step 224 yields a no result, then the controller skips to step 228.

In step 228, the controller decides whether the specific order requires articles in zone A/B. If the order does not require articles in zone A/B, then the order was filled by the proceeding steps and step 228 yields a no result. The controller skips to step 234 when step 228 yields a no result and the order is transported to a packaging station where the order is packaged for shipment. If step 228 yields a yes result, then the assigned section is transported through zone A/B and the controller causes the A-frame dispensers in zone A/B to dispense ordered articles into the assigned section (step 232). After completion of step 232, the controller proceeds to the packaging step 234.

In step 230, after step 212 yields a no result, the controller assigns an order receiving section on a conveyor at the input of zone A/B. The controller then sequentially discharges ordered articles to the assigned section in step 232 from the dispensers in zone A/B. After completion of step 232, the controller proceeds to step 234 to package the order.

The above process illustrates a decisional sequence for a controller to fill a single order. As multiple orders are assigned to separate sections of a conveyor travelling simultaneously through the subzones $C_1, \ldots C_{n-1}, C_n$ and zone A/B, the controller will be at various stages in the decisional sequence for each order. The controller may also compute the above decisional sequence prior to running the order filling hardware to develop a schedule of commands. The schedule of commands are run in real time to operate the hardware filling the orders. Further, it is foreseen that the zones C, A, and A/B may be rearranged so that the decisional sequence decides if articles are in zone A before zone C and in zone A/B before zones C or A.

The overall article storage and retrieval system and specifically the order picking system as described above, without in any way limiting or restricting the scope of the invention, is particularly desirable for use in environments wherein articles are being selected from an extremely large inventory of different articles, and is believed particularly desirable for the storing and picking of packaged compact discs (CDs). Such CDs, dominantly music CDs, involve an extremely large number of different titles, which different titles also involve significantly different categories of music such as classical, rock, country and western, etc. For example, the overall inventory of such items (i.e., CDs) may be in excess of 10,000 different items (i.e., different titles), and can be about 20,000 different articles. At the same time, however, the most popular and commonly ordered titles normally comprises no more than about 20% and more typically about 10% of the overall inventory of titles. The remaining titles, which thus constitute the low or moderate demand titles, thus typically constitute about 80% or more of the total titles. This latter grouping, however, typically only constitutes about 20% or less of the total articles ordered, whereas the high frequency titles typically constitutes over 80% and generally closer to 90% of the titles ordered. In such a situation, the picking section A of this invention which incorporates therein the Bombardier-type dispensers, i.e. dispensers 75, will typically maintain therein a small number of only high-frequency titles, such as for example in the neighborhood of 60 to 100 titles, whereas the pick zone A/B may contain from between about 600 to about 1,000 different titles, all high and moderate frequency of selection. The picking zone C, on the other hand, in total, will contain therein less than the overall inventoried number of different titles of the C type, but this picking zone nevertheless will still contain therein, within the totes associated with the pick interfaces of the picking subzones, a total number of different titles which may be in the neighborhood of at least 3,000 to 4,000 different titles, or more for example 7,000 to 8,000 different titles, with each subzone having about 600 to about 1,000 titles, so that the total pick zone C will thus contain therein a number of titles which will be typically several times greater than the number of titles contained in the pick zone A/B, and many times greater than the number of titles in pick zone A. All of the titles required to fill a specific order filling operation will thus be available to fill all of the orders in the operation.

In addition, to facilitate the distribution of the articles or items picked from the different subzones, the articles within the different subzones will preferably be distributed such that titles of one type or category, such as country and western, will be fairly uniformly distributed throughout the subzones, and similarly titles of another category such as classical music will also be fairly uniformly distributed throughout the different subzones. By distributing the different titles of each category throughout the different subzones, the overall order picking process can be more efficiently carried out since it has been observed that individual orders typically or frequently contain a plurality of different titles from within a single category such as classical or the like, and thus the overall pick zone C can more efficiently and individually pick the selected titles by being able to pick the titles sequentially from the different subzones, rather than requiring that all of the titles for a single order be selected from a single subzone.

While the system as described above references the articles as being CDs, it will be readily recognized that numerous other articles including specifically video discs, tapes and the like are also equally applicable for use with the system of this invention.

It will be understood that the operation of the modified systems of FIGS. 21–23 and 24–27 is generally the same as the operation described above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An automated storage and retrieval system for an inventory of numerous items, the inventory having a first plurality of different high selection frequency items and a second plurality of different low selection frequency items, comprising:
   a plurality of portable totes each having a plurality of cells, each said cell being adapted to removably store a vertical stack of identical items therein;
   a storage arrangement including storage racks receiving said totes, a vehicle for moving said totes into and out of said storage racks, and means for replenishing empty cells in said totes with said inventory;
   an order filling system having a low frequency pick zone for filling orders requiring at least one of said low selection frequency items, a high frequency pick zone for filling orders requiring at least one of said high selection frequency items, an elongate conveyor system moving horizontally adjacent said low and high frequency pick zones, and an order receiving area being defined on said conveyor system;
   said low frequency pick zone including a first support receiving thereon a plurality of said totes containing stacks of low selection frequency items therein, and an item picking means for retrieving an ordered low selection frequency item from an item containing cell in one of said totes on said first support;
   said high frequency pick zone including a second support receiving thereon a plurality of said totes containing stacks of said high selection frequency items therein, an item dispensing means for dispensing an ordered high selection frequency item to said order receiving area, said item dispensing means having a compartment receiving said items therein, and a means for replenishing said item dispensing means with stacks of items from the totes on said second support; and
   means for coordinating and controlling the automated operation of said vehicle, said means for replenishing empty cells in said totes with items, said conveyor system, said item picking means, said item dispensing means, and said means for replenishing said item dispensing means.

2. The automated storage and retrieval system according to claim 1, wherein said low frequency pick zone includes vertically extending posts and horizontally-extending rails mounted to said posts, said rails extending parallel to said conveyor system, said item picking means including an article picking mechanism movably supported on at least one of said rails, said article picking mechanism being movable generally parallel to said conveyor system and including a carriage movable generally transverse to said conveyor system and above said totes stored on said first support, and a pickup head secured to said carriage for picking up items and being reciprocatingly movable in a vertical direction.

3. The automated storage and retrieval system according to claim 1, wherein said tote comprises:
   a base structure including a generally horizontally enlarged platelike base;
   an upright divider structure fixed to said base structure and defining a plurality of vertically elongated and upwardly opening cells each adapted to support a said stack of items therein, said cells being disposed adjacent one another so as to define rows which extend in both transverse and longitudinal directions relative to the base;
   said divider structure including walls which define vertically elongate slotlike spaces which open downwardly from the open upper end of each cell with said slotlike spaces being disposed for open communication with opposite sides of each said cell; and
   means cooperating between said divider structure and said base structure for permitting the divider structure to be adjustably but fixedly positioned relative to said base structure to selectively vary the cross sectional shape or size of said cell.

4. A storage and retrieval system for an inventory of items including a first plurality of different high selection frequency articles and a second plurality of different low selection frequency articles, comprising:
   a plurality of portable totes each having a plurality of upwardly opening cells, each said cell removably storing a vertical stack of identical articles therein;
   an upright and horizontally elongated storage rack defining a plurality of horizontally elongated storage shelves disposed one above the other in vertically spaced relation, each said shelf supporting thereon a plurality of said totes disposed in a row which extends in a lengthwise direction parallel with the elongate direction of the storage rack;
   an access aisle extending generally parallel with said lengthwise direction, said storage rack being disposed adjacent one side of said access aisle;
   a first article pick zone defined adjacent the other side of said aisle and extending parallel with said lengthwise direction, said first pick zone including a plurality of subzones each including a support platform elongated generally parallel to said lengthwise direction, each said support platform supporting thereon a plurality of said totes disposed in a row which extends parallel to said lengthwise direction;
   a horizontally elongate movable conveyor for collecting and transporting articles defining orders, said conveyor including a respective horizontally elongate conveyor section associated with each said subzone, said conveyor section being disposed adjacent a side of said support platform which is opposite from said aisle, said conveyor section being movable parallel with said lengthwise direction;
   an article picking mechanism associated with each said subzone for removing a selected individual article from one of the totes in said subzone and effecting transfer thereof to a selected area on the respective moving conveyor section, said article picking mechanism including a support carriage supported for movement horizontally generally parallel with said lengthwise direction substantially throughout the length of the respective subzone, and an article picking head movably mounted on said carriage for movement both vertically and horizontally in transverse relation to said lengthwise direction, said article picking head being disposed above the totes in said subzone and having a gripper on a lower end thereof for engagement with an article; and a tote transfer vehicle associated with said aisle and movable vertically and horizontally thereof for effecting transfer of said totes to and from said storage rack and said support platforms.

5. A system according to claim 4, including a second pick zone having a plurality of sidewardly disposed article dispensers each containing therein a stack of identical articles, said elongate movable conveyor including a further horizontally elongate conveyor section which is disposed adjacent and horizontally movable past said plurality of dispensers, whereby said dispensers dispense discharge individual articles which are deposited in predefined areas on said further conveyor section.

6. A system according to claim 4, including at least one intermediate article transfer device associated with each said subzone and positioned adjacent the respective conveyor section for depositing the article onto the selected area of the respective conveyor section, said article picking mechanism effecting removal of the selected article from one of the totes and transfer of the article to the intermediate transfer device.

7. A system according to claim 4, wherein at least some of the subzones are disposed vertically one above the other.

8. A system according to claim 7, wherein at least some of said subzones are disposed in horizontally adjacent but sidewardly spaced relationship.

9. A system according to claim 4, including control means for coordinating and controlling (1) automated operation of said tote transfer vehicle to effect transfer of said totes between said storage rack and said first pick zone, (2) preassigning of said selected areas on said conveyor according to predefined orders for articles, and (3) movement of said article picking mechanism to effect picking of the selected article and transfer thereof to the selected area on the conveyor.

10. A system according to claim 4, including a tote replenishment station having a support wall which supports therein a plurality of said totes, and a transfer mechanism movably positioned above the totes on said support wall for effecting lifting of a stack of articles from a selected cell of one of said tote, followed by moving the stack horizontally to a position over a cell of another tote, and then lower the stack into the last-mentioned cell for deposit therein.

11. A system according to claim 5, including means for filling said dispensers with stacks of articles, said means including a supporting wall having a plurality of said totes supported thereon, and a stack transfer device for effecting removal of a selected stack of articles from a selected tote disposed on said supporting wall and thereafter moving said stack to a selected dispenser and depositing said stack therein.

12. An automated order filling system for an inventory of numerous articles, the inventory having a plurality of different low selection frequency articles, comprising:

a plurality of cells each respectively removably storing a plurality of identical said low selection frequency articles therein, each said cell storing a stack of said articles therein and being open at one end;

an order filling system defining a pick zone for filling orders requiring at least one of said low selection frequency articles and including an elongate conveyor system moving horizontally adjacent said pick zone, an order receiving area being defined on said conveyor system;

said pick zone including a storage rack storing said cells in a two-dimensional array adjacent said conveyor system, said array extending parallel to a direction of movement of said conveyor system, and an article picking device for retrieving an ordered low selection frequency article from a said cell in said storage rack;

said article picking device including an elongate fixed support rail extending parallel to the direction of movement of said conveyor system, an elongate intermediate rail which extends transversely with respect to said support rail and is movably supported on said support rail for movement substantially parallel to the direction of movement of said conveyor system, and an article-picking head supported on said intermediate rail for movement lengthwise therealong, said head being movable transverse to said intermediate rail and to the direction of movement of said conveyor system so that said pick head is positionable adjacent said ordered article in said cell in said storage rack, said head including a picking member for removing said ordered article from said cell; and means for coordinating and controlling the automated operation of said conveyor system and said article picking device.

13. The automated order filling system according to claim 12, wherein each of said cells includes a base and elongate side walls fixed to said base defining an elongate slotlike space for accommodating a stack of articles lengthwise thereof, and said picking member extending into said space to remove one said ordered article from said cell.

14. The automated order filling system according to claim 12, wherein said cell is defined by a portable tote and a plurality of said totes are positioned in said pick zone.

15. The automated order filling system according to claim 12, wherein said order filling system includes a plurality of said pick zones with a first said pick zone being on one side of said conveyor system and a second said pick zone being on the other side of said conveyor system, and said article picking device retrieving articles from said cells in said first and second pick zones.

16. The automated order filling system according to claim 12, wherein said order filling system includes a plurality of said pick zones with a first said pick zone being positioned on one side of said conveyor system and a second said pick zone being positioned vertically above said first pick zone.

17. The automated order filling system according to claim 12, wherein a plurality of said pick zones are longitudinally spaced along said conveyor system, and each said pick zone has a said article picking device associated therewith.

* * * * *